(12) United States Patent
Yoo et al.

(10) Patent No.: US 10,417,974 B2
(45) Date of Patent: Sep. 17, 2019

(54) DEVICE AND METHOD FOR CONTROLLING DISPLAY

(71) Applicant: Samsung Electronics Co., Ltd., Gyeonggi-do (KR)

(72) Inventors: Jaebong Yoo, Seongnam-si (KR); Hyuk Kang, Yongin-si (KR); Dukki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 14/687,697

(22) Filed: Apr. 15, 2015

(65) Prior Publication Data
US 2015/0294627 A1    Oct. 15, 2015

(30) Foreign Application Priority Data
Apr. 15, 2014 (KR) .................. 10-2014-0044613

(51) Int. Cl.
*G09G 3/34* (2006.01)
*G09G 5/00* (2006.01)
(Continued)

(52) U.S. Cl.
CPC ......... *G09G 3/3426* (2013.01); *G06F 3/0481* (2013.01); *G06F 3/147* (2013.01);
(Continued)

(58) Field of Classification Search
CPC ... H04M 1/72569; G09G 3/3426; G09G 5/00; G09G 2320/0646; G09G 5/10; G09G 2320/062; G09G 2320/0686; G09G 2340/04; G09G 2320/08; G09G 2330/021; G09G 2358/00; G09G 2354/00; G09G 2340/12; G09G 2340/0428;
(Continued)

(56) References Cited

U.S. PATENT DOCUMENTS 5,598,565 A    1/1997   Reinhardt
8,358,273 B2    1/2013   Hodge et al.
(Continued)

FOREIGN PATENT DOCUMENTS

CN    1959349 A    5/2007
CN    102681765 A    9/2012
(Continued)

OTHER PUBLICATIONS

International Search Report dated Jun. 18, 2015 in connection with International Application No. PCT/KR2015/003618; 5 pages.
(Continued)

*Primary Examiner* — Abhishek Sarma

(57) ABSTRACT

According to various embodiments, a display control method of an electronic device includes: determining content to display to the outside of an electronic device based on contextual information associated with the electronic device; automatically configuring one region of a display functionally connected to the electronic device as a highlighted region; and displaying, through the highlighted region, at least a part of the content in a higher visibility state than the remaining region of the display except for the highlighted region in response to an input. In addition, other embodiments can be made.

30 Claims, 13 Drawing Sheets

(51) Int. Cl.
  *G09G 5/10* (2006.01)
  *G06F 3/147* (2006.01)
  *G06F 3/0481* (2013.01)
  *H04M 1/725* (2006.01)

(52) U.S. Cl.
  CPC ............... *G09G 5/00* (2013.01); *G09G 5/10* (2013.01); *H04M 1/72569* (2013.01); *G09G 2320/062* (2013.01); *G09G 2320/0646* (2013.01); *G09G 2320/0686* (2013.01); *G09G 2320/08* (2013.01); *G09G 2330/021* (2013.01); *G09G 2340/04* (2013.01); *G09G 2340/0428* (2013.01); *G09G 2340/12* (2013.01); *G09G 2340/14* (2013.01); *G09G 2354/00* (2013.01); *G09G 2358/00* (2013.01); *G09G 2360/144* (2013.01)

(58) Field of Classification Search
  CPC .......... G09G 2360/144; G09G 2340/14; G06F 3/147; G06F 3/0481
  See application file for complete search history.

(56) References Cited

U.S. PATENT DOCUMENTS

| | | |
|---|---|---|
| 2003/0146897 A1 | 8/2003 | Hunter |
| 2006/0227125 A1* | 10/2006 | Wong ................ G09G 5/14 345/211 |
| 2007/0101290 A1 | 5/2007 | Nakashima et al. |
| 2007/0124693 A1* | 5/2007 | Dominowska .... G06F 17/30867 715/772 |
| 2007/0273714 A1* | 11/2007 | Hodge ................ G09G 3/20 345/690 |
| 2010/0320919 A1* | 12/2010 | Gough ................ G09G 3/20 315/158 |
| 2011/0181611 A1 | 7/2011 | Zhang et al. |
| 2011/0202835 A1* | 8/2011 | Jakobsson ............ G06F 3/0481 715/702 |
| 2011/0261087 A1 | 10/2011 | Bahk |
| 2012/0127218 A1 | 5/2012 | Son |
| 2012/0229493 A1 | 9/2012 | Kim et al. |
| 2012/0280921 A1 | 11/2012 | Kwon |
| 2014/0002428 A1 | 1/2014 | Letourneur et al. |

FOREIGN PATENT DOCUMENTS

| | | |
|---|---|---|
| EP | 1 884 867 A1 | 2/2008 |
| KR | 2011 0028772 A | 3/2011 |
| KR | 2012 0034491 A | 4/2012 |
| KR | 2012 0075845 A | 7/2012 |
| KR | 2012 0124202 A | 11/2012 |
| KR | 2013 0090244 A | 8/2013 |
| WO | WO 99/47990 A1 | 9/1999 |
| WO | WO 2015/160148 | 10/2015 |

OTHER PUBLICATIONS

Written Opinion of the International Searching Authority dated Jun. 18, 2015 in connection with International Application No. PCT/KR2015/003618; 10 pages.

Extended European Search Report dated Aug. 19, 2015 in connection with European Patent Application No. 15163006.8; 8 pages.

China National Intellectual Property Administration First Office Action regarding Application No. 201580011990.1, dated Dec. 18, 2018, 22 pages.

* cited by examiner

DEVICE AND METHOD FOR CONTROLLING DISPLAY

CROSS-REFERENCE TO RELATED APPLICATION AND CLAIM OF PRIORITY

The present application is related to and claims priority from and the benefit under 35 U.S.C. § 119(a) of Korean Patent Application No. 10-2014-0044613, filed on Apr. 15, 2014, which is hereby incorporated by reference for all purposes as if fully set forth herein.

TECHNICAL FIELD

Various embodiments of the present disclosure relate to a device and method for controlling a display.

BACKGROUND

According to the development of information and communication industries, electronic devices function as important means for transferring various types of information to users. The electronic devices displays various types of information through displays thereof. In addition, for user convenience, the electronic devices provides a Graphic User Interface (GUI) using the displays.

SUMMARY

Electronic devices are driven to display only a portion of a graphic user interface displayed on a display by partially applying power to one region of the display. When driven in such a manner, the electronic devices have difficulty in displaying content different from the currently displayed content on a display screen through the region of the display. In addition, the electronic devices cannot dynamically adjust the size, shape, or display setting of the region of the display. Accordingly, the electronic devices can malfunction, brightly display an unnecessary portion, and waste power consumption. Further, a user cannot execute content that is displayed in the region through an additional input and have difficulty in manipulating the region. Furthermore, when the whole region of the screen in the off state is unexpectedly turned on in a low illumination state (such as a state in which a lamp is turned on in a theater, an airplane, a train, a bus, or the like), a user or other people therearound can be dazzled. Moreover, as the whole region of the screen is unexpectedly turned on, information requiring security (such as privacy) can be brightly displayed on the screen in the low illumination state. In this case, the information requiring security is easily exposed to other people around the user.

To address the above-discussed deficiencies, it is a primary object to provide a user interface that determines content to display in a region of a display screen based on contextual information associated with an electronic device and display at least a part of the corresponding content in a higher visibility state than the remaining region, thereby transferring more various types of information, enhancing user convenience, and reducing unnecessary power consumption.

A display control method, according to an embodiment, for solving such problems in the related art includes: determining content to display to the outside of an electronic device based on contextual information associated with the electronic device; configuring one region of a display functionally connected to the electronic device as a highlighted region; and displaying, through the highlighted region, at least a part of the content in a higher visibility state than the remaining region of the display screen except for the highlighted region in response to an input.

Various embodiments of the present disclosure provide an electronic device and a method that determines content to display in a region of a display screen based on contextual information associated with the electronic device and displays at least a part of the corresponding content in a higher visibility state than the remaining region, thereby transferring more various types of information in a higher visibility state. In addition, the electronic device dynamically adjusts the location, size, shape, or display setting of one region of the display screen to reduce unnecessary power consumption. Based on a user input associated with one region of the display screen, the electronic device adjusts the size, shape, or display setting of the region, move the region, or execute a function or application displayed on the region, thereby enhancing user convenience related to the region.

Various embodiments of the present disclosure provide an electronic device and a method that display only some information or only one region of a display screen in a low illumination environment (such as a state in which a lamp is turned on in a theater, an airplane, a train, a bus, or the like), thereby preventing glare. In addition, the electronic device restricts display of information requiring security (such as privacy) according to a user's situation or the state of the electronic device, thereby improving user security.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
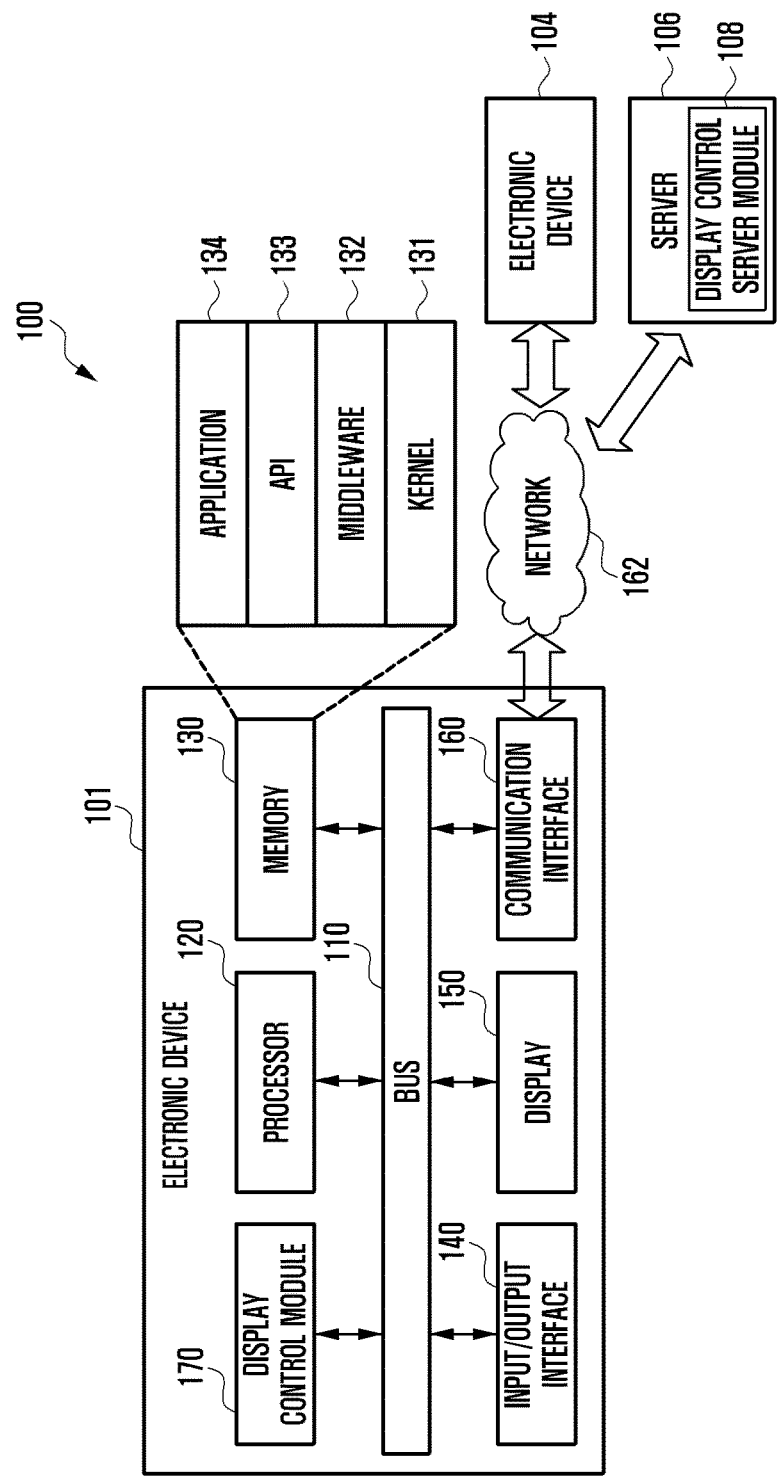
FIG. 1 illustrates a network environment including an electronic device according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Exemplary embodiments of the present disclosure are described with reference to the accompanying drawings in detail. Various changes can be made to the disclosure, and the disclosure can have various forms, such that exemplary embodiments will be illustrated in the drawings and described in detail. However, such an embodiment is not intended to limit the disclosure to the disclosed exemplary embodiment and it should be understood that the embodiment include all changes, equivalents, and substitutes within the spirit and scope of the disclosure. Throughout the drawings, like reference numerals refer to like components. It will be understood that the expressions "comprises" and "may comprise" are used to specify presence of disclosed function, operation, component, etc. but do not preclude the presence of one or more functions, operations, components, etc. It will be further understood that the terms "comprises" or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A or B is to be taken as specific disclosure of each of A, B, and A and B.

As used herein, terms such as "first," "second," etc. are used to describe various components, however, it is obvious that the components should not be defined by these terms. For example, the terms do not restrict the order or importance of the corresponding components. The terms are used only for distinguishing one component from another component. For example, a first component can be referred to as a second component and likewise, a second component can also be referred to as a first component, without departing from the teaching of the inventive concept. It will be understood that when an element or layer is referred to as being "on," "connected to" or "coupled to" another element or layer, it can be directly on, connected or coupled to the other element or layer or intervening elements or layers can be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms "a," "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device includes devices having an operation support function. Examples of the electronic device include a smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (such as a head-mounted device (HMD) such as electronic glasses, electronic clothing, electronic bracelet, electronic necklace, electronic appcessory, electronic tattoo, smart-watch, etc.

According to various embodiments, the electronic device is one of smart home appliances having operation support function. Examples of the smart electronic appliance as an electronic device include a television, Digital Video Disk (DVD) player, audio player, refrigerator, air-conditioner, vacuum cleaner, electronic oven, microwave oven, laundry machine, air cleaner, set-to box, TV box (such as a SAMSUNG HOMESYNC, APPLE TV, and GOOGLE TV), game console, electronic dictionary, electronic key, camcorder, and electronic frame, etc.

According to various embodiments, examples of the electronic device include a medical device (such as a Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (such as a maritime navigation device and gyro compass), aviation electronic device (avionics), security device, vehicle head unit , industrial or home robot, Automatic Teller's Machine (ATM) of financial institution, Point Of Sales (POS), etc.

According to various embodiments, examples of the electronic device include furniture and a building or structure having a communication function, electronic board, electronic signature receiving device, projector, and metering device (such as water, electric, gas, and electric wave metering devices). According to various embodiments, the electronic device is any combination of the aforementioned devices. According to various embodiments of the present disclosure, the electronic device is a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments denotes a person or a device (such as an artificial intelligent electronic device) using the electronic device.

FIG. 1 illustrates a network environment 100 including an electronic device 101 according to various embodiments of the present disclosure. Referring to FIG. 1, the electronic device 101 includes a bus 110, a processor 120, a memory 130, an input/output interface 140, a display 150, a communication interface 160, and a display control module 170.

The bus 110 is a circuit for connecting the aforementioned elements to each other and transmitting communication (such as a control message) between the aforementioned elements.

For example, the processor 120 receives instructions from the aforementioned other elements (such as the memory 130, the input/output interface 140, the display 150, the communication interface 160, and the display control module 170) through the bus 110, decodes the received instructions, and performs calculation or data processing according to the decoded instructions.

The memory 130 stores the command or data received from the processor 120 or other components (such as the input/output interface 140, display 150, communication interface 160, operation module 170, etc.) or generated by the processor 120 or other components. The memory 130 stores program modules including kernel 131, middleware 132, Application Programming Interface (API) 133, applications 134, etc. Each programing module is implemented as software, firmware, hardware, and any combination thereof.

The kernel 131 controls or manages the system resources (such as a bus 110, processor 120, and memory 130) for use in executing the operation or function implemented with the middleware 132, the API 133, or the application 134. The kernel 131 also provides an interface allowing the middleware 132, API 133, or application 134 to access the components of the electronic device 101 to control or manage.

The middleware 132 works as a relay of data communicated between the API 133 or application 134 and the kernel 131. The middle 132 executes control of the task requests from the applications 134 in such a way of assigning priority for use of the system resource (such as the bus 110, processor 120, and memory 130) of the electronic device to at least one of the applications 134.

The API 133 is the interface for the applications 134 to control the function provided by the kernel 131 or the middleware 132 and includes at least one interface or function (such as a command) for file control, window control, image control, or text control.

According to various embodiments, the application 134 includes a Short Message Service (SMS)/Multimedia Message Service (MMS) application, an e-mail application, a calendar application, an alarm application, a health care application (such as an application for measuring an amount of exercise or blood sugar), and an environmental information application (such as an application for providing an atmospheric pressure, humidity, temperature, and the like). The application 134 includes an application related to an information exchange between the electronic device 101 and an external electronic device (such as an electronic device 104). The application related to the information exchange includes, for example, a notification relay application for transferring particular information to the external electronic device or a device management application for managing the external electronic device.

For example, the notification relay application includes a function of transferring, to the external electronic device (such as the electronic device 104), notification information generated from other applications of the electronic device 101 (such as an SMS/MMS application, an e-mail application, a health management application, an environmental information application, and the like). The notification relay application receives notification information from, for example, the external electronic device (such as the electronic device 104) and provides the received notification information to a user. For example, the device management application manages (such as install, delete, or update) functions for at least a part of the external electronic device (such as the electronic device 104) communicating with the electronic device 101 (such as turning on or off the external electronic device itself (or some elements thereof) or adjusting brightness (or resolution) of a display), applications operating in the external electronic device, or services (such as a telephone call service or a message service) provided from the external electronic device.

According to various embodiments, the application 134 includes an application designated according to an attribute (such as a type of the electrode device) of the external electronic device (such as the electronic device 104). For example, when the external electronic device is an MP3 player, the application 134 includes an application related to the reproduction of music. When the external electronic device is a mobile medical appliance, the application 134 includes an application related to health care. According to certain embodiments, the application 134 includes at least one of an application designated to the electronic device 101 and an application received from the external electronic device (such as a server 106 or the electronic device 104).

The input/output interface 140 transfers instructions or data input from a user through an input/output device (such as a sensor, a keyboard, or a touch screen) to, for example, the processor 120, the memory 130, the communication interface 160, or the media content sorting module 170 through the bus 110. For example, the input/output interface 140 provides, to the processor 120, data for a user's touch input through the touch screen. Further, the input/output interface 140 outputs, for example, an instruction or data received through the bus 110 from the processor 120, the memory 130, the communication interface 160, and the media content sorting module 170, through an input/output device (such as a speaker or display). For example, the input/output interface 140 outputs voice data processed through the processor 120 to the user through the speaker.

The display 150 displays various pieces of information (such as multimedia data or text data) to a user.

The communication interface 160 connects communication between the electronic device 101 and the external electronic device (such as the electronic device 104 or the server 106). For example, the communication interface 160 communicates with the external device (such as the electronic device 104 or the server 106) while being connected to a network 162 through wireless communication or wired communication. The wireless communication includes at least one of, for example, Wi-Fi (Wireless Fidelity), BLUETOOTH (BT), Near Field Communication (NFC), Global Positioning System (GPS) and cellular communication (such as Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication includes at least one of, for example, a Universal Serial Bus (USB), a High Definition Multimedia Interface (HDMI), Recommended Standard 232 (RS-232), and a Plain Old Telephone Service (POTS).

According to certain embodiments, the network 162 is a communication network. The communication network includes at least one of a computer network, the Internet, the Internet of things, and a telephone network. According to certain embodiments, a protocol (such as a transport layer protocol, data link layer protocol, or a physical layer protocol) for communication between the electronic device 101 and the external device be supported by at least one of the application 134, the application programming interface 133, the middleware 132, the kernel 131, and the communication interface 160.

According to certain embodiments, the server 106 supports the driving of the electronic device 101 by performing at least one operation (or function) implemented in the electronic device 101. For example, the server 106 includes a display control server module 108 that supports the display control module 170 implemented in the electronic device 101. For example, the display control server module 108 includes at least one element of the display control module 170 to perform at least one of the operations performed by the display control module 170 (such as execute at least one operation on behalf of the display control module). The display control server module 108 is, for example, an on-line market server (such as an App store) providing or selling content or an application that is loaded in the electronic device 101.

The display control module 170 controls the other elements (such as the display 150) to process at least some information acquired from the other elements (such as the processor 120, the memory 130, the input/output interface 140, and the communication interface 160) and provides the processed information to a user through various methods. According to certain embodiments, the display control module 170 generates information to display to the outside using the processor 120 or independently of the processor 120 and displays at least some of the generated information using the display 150. In addition, at least a part of the display control module 170 is implemented as at least one processor.

According to certain embodiments, the display control module 170 determines information (such as content) to display through the display 150, for example, based on contextual information associated with the electronic device. According to certain embodiments, the display control module 170 determines a location or region where designated information (such as content) will be displayed on the display. According to certain embodiments, the display control module 170 controls the display 150 such that at least one region (such as a highlighted region) of the display 150 has a different (such as higher) visibility from another region thereof (such as an invisible region, a weak visible region, or a power-saving display region). According to certain embodiments, the display control module 170 controls the display 150 to turn off at least one region (pixels) of the display 150, to output only one color through the at least one region, or to turn on only sub-pixels corresponding to at least one color among a plurality of sub-pixels of the at least one region in order to reduce power consumption.

According to certain embodiments, at least a part of the display control module 170 be, for example, a graphic processor. According to certain embodiments, at least a part of the display control module 170 is included as a part of logic performed by the processor 120. Additional information on the display control module 170 is provided through FIG. 2 described below.

Figure 2:
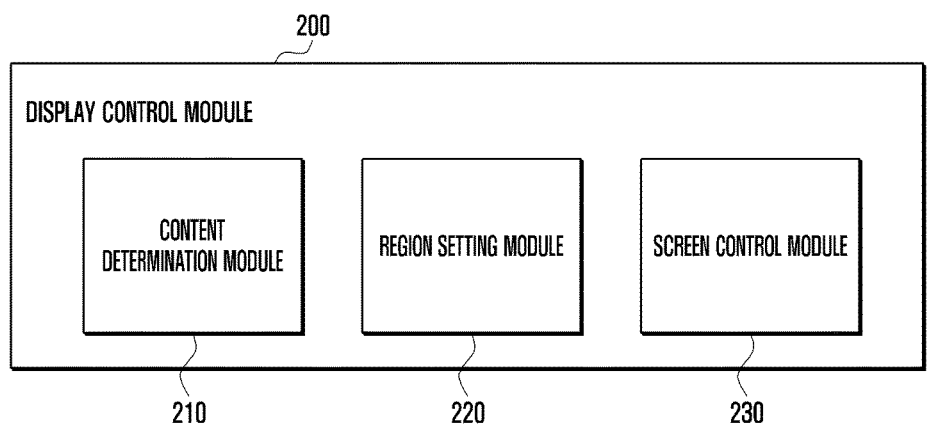
FIG. 2 illustrates a display control module of an electronic device according to various embodiments of the present disclosure.

FIG. 2 illustrates a display control module 200 of an electronic device according to various embodiments of the present disclosure. Referring to FIG. 2, the display control module (such as the display control module 170) includes a content determination module 210, a region setting module 220, and a screen control module 230.

The content determination module 210 acquires, for example, contextual information associated with the electronic device (such as the electronic device 101). According to certain embodiments, the contextual information include, for example, information on an event, a location, time, a battery state, and a running application that are related to the electronic device. According to certain embodiments, the contextual information includes information collected by a sensor functionally connected to the electronic device, such as motion and speed of the electronic device, intensity of illumination around the electronic device, a degree of light emission of the electronic device itself, and bio-information (a heart rate) related to an electronic device user. According to certain embodiments, the contextual information includes information related to an accessory device (a cover, a casing, or a wearable device) of the electronic device, such as the type, size, dimension, and color of the accessory device, a state in which the accessory device is connected (worn), or an open or closed state of the cover. According to certain embodiments, when the electronic device corresponds to a car head unit or a car kit, the contextual information includes environmental information such as brightness, intensity of illumination, or weather.

The content determination module 210 determines content (such as news, weather, schedule, recommended content, or behavior guide) to display based on the acquired contextual information. According to certain embodiments, in response to an event (such as a user input, an alarm, an alert, or a notification) generated in relation to the electronic device, the content determination module 210 determines at least one of a function and an application, which are associated with the event, as at least a part of the content. For example, when ambient environment information (such as intensity of illumination) measured by an environmental information sensor module (such as illumination sensor) functionally connected to the electronic device corresponds to a designated condition (for example, when the current intensity of illumination is weaker than the reference intensity of illumination), an event related to the ambient environment information is generated. In addition, when the state information (such as a battery residual quantity) of the electronic device corresponds to a designated condition (such as when the current battery residual quantity is less than the reference residual quantity), an event related to the state information is generated. Furthermore, when the electronic device receives a call or a message from an external device, an event related to the received call or message is generated.

According to certain embodiments, the content determination module 210 determines a current date, a day of the week, time, or at least one combination thereof as at least a part of the content when locking is configured to restrict at least some functions of the electronic device. According to certain embodiments, when a website providing news in real time exists in a visit history associated with the electronic device, the content determination module 210 refers to news recently updated from the website to determine the recently updated news as at least a part of the content.

The region setting module 220 configures at least one region of a display screen functionally connected to the electronic device as a highlighted region to be displayed in a higher visibility state. According to certain embodiments, the region setting module 220 configures at least a part of the remaining region of the display screen except for the highlighted region as another region (such as an invisible region, a weak visible region, or a power-saving display region) to be displayed in a lower visibility state.

According to certain embodiments, the region setting module 220 determines the location of the highlighted region based on contextual information, a preset location, or a user input. According to certain embodiments, the region setting module 220 determines the shape of the highlighted region (such as a circle or rectangle), for example, based on at least one of contextual information, a preset shape, a user input, and a display attribute of content. According to certain embodiments, the region setting module 220 determines the size of the highlighted region, for example, based on at least one of contextual information, a preset size, a user input, a display attribute of content, and a display setting of the highlighted region. According to certain embodiments, the region setting module 220 determines the color of the highlighted region, for example, based on at least one of contextual information, a preset size, a user input, a display attribute of content, and a display setting of the highlighted region.

According to certain embodiments, when an accessory (such as a cover) is mounted to the electronic device, the region setting module 220 determines the location or size of the highlighted region based on a region open to a user's view among the display screen of the electronic device or accessory. According to certain embodiments, the region setting module 220 determines the location, shape, size, color, or brightness of the highlighted region based on the type, size, dimension, color, or brightness (a degree of light emission) of the accessory (such as a wearable device) connected to the electronic device. According to certain embodiments, the region setting module 220 determines the location, shape, size, color, or brightness of the highlighted region based on environmental information (such as brightness, intensity of illumination, or weather) related to the electronic device (such as a car head unit or a car kit). According to certain embodiments, the region setting module 220 determines the location, shape, size, color, or brightness of the highlighted region based on information measured by a sensor functionally connected to the electronic device, such as, motion or speed of the electronic device, intensity of illumination around the electronic device, or a user's bio-information (such as a heart rate). The region setting module 220 determines the size or brightness of the highlighted region to be greater while jogging or driving at night than in the daytime.

According to certain embodiments, the region setting module 220 determines the location, shape, size, color, or brightness of the highlighted region based on environmental information related to the electronic device (such as a car head unit or a car kit). According to certain embodiments, when the electronic device is a home automation device (such as a smart light, a smart TV, or a smart home appliance), the region setting module 220 determines the location, shape, size, color, or brightness of the highlighted region based on illumination information or light emission state information related to the electronic device.

According to certain embodiments, the region setting module 220 configures the remaining region of the display screen, except for a region where a blocked content designated by a user is displayed, as the highlighted region when the at least a part of the content is determined to correspond to the blocked content. In addition, the region setting module 220 configures the region where the blocked content is displayed on the display screen as at least one of an invisible region, a weak visible region, and a power-saving display region in order to prevent the blocked content from being displayed on the display screen. The region setting module 220 determines the region where the blocked content is displayed as an invisible region in order to raise visibility of the highlighted region and prevent gazing at unnecessary information while jogging or driving at night.

The screen control module 230 controls the display screen to display at least a part of content through a highlighted region thereof in a higher visibility state than the remaining region of the display screen (such as an invisible region, a weak visible region, or a power-saving display region) except for the highlighted region. According to certain embodiments, the screen control module turns off at least some pixels of the remaining region of the display screen except for the highlighted region (invisible region). According to certain embodiments, the screen control module 230 outputs at least a part of the remaining region at a lower brightness, outputs the same color (such as black) irrespective of content, or turns on only sub-pixels corresponding to at least one color among sub-pixels in the remaining region (weak visible region or power-saving display region).

According to some embodiments, the screen control module 230 adjusts a display setting (such as the size, shape, brightness, luminance, color, saturation, clarity, transparency, gamma, resolution, contrast ratio, view angle, color reproduction range, color temperature, grayscale linearity, transmittance, or contrast) of the highlighted region based on at least one of a preset size, a user input, contextual information, and a display attribute of content. According to certain embodiments, the screen control module 230 reduces the brightness of the highlighted region in order to decrease power consumption when the battery level of the electronic device is lower than a predetermined reference. According to certain embodiments, the screen control module 230 controls the display screen to block power (or a signal) provided to at least some pixels constituting the highlighted region. According to certain embodiments, the screen control module 230 adjusts (magnify) a display attribute (such as size or resolution) of content based on at least one of contextual information, a preset size, a user input, and a display setting of the highlighted region. The screen control module 230 controls the display screen to make content larger and display it while jogging or driving at night than in the daytime.

According to certain embodiments, the screen control module 230 adjusts the color of the highlighted region (such as reverse the color or display the highlighted region in grayscale), adjusts (magnify or reduce) the size of the highlighted region, rotate the highlighted region, or reverses the left and the right of the highlighted region based on at least one of contextual information, preset setting information, a user input, and a display attribute of content.

According to some embodiments, when at least one of a touch input, a proximity input, a gesture input, and a gaze input that are associated with the highlighted region is recognized, the screen control module 230 executes a function or an application corresponding to the recognized input using the highlighted region. When a proximity movement input or a swipe input that is associated with the highlighted region is recognized, the screen control module 230 moves the highlighted region in response to the proximity movement input or the swipe input such that at least the highlighted region includes the location where the proximity movement input or the swipe input is released. When a user input associated with the electronic device is recognized while content is being displayed through the highlighted region, the screen control module 230 magnifies or reduces the highlighted region or change the shape of the highlighted region based on the recognized user input.

According to some embodiments, the screen control module 230 controls display of the remaining region to turn off at least some pixels in the remaining region or output the same color through the at least some pixels. According to certain embodiments, the screen control module 230 controls the display of the remaining region such that the at least some pixels and the remaining pixels except for the at least some pixels among the pixels in the remaining region form a grid pattern, According to some embodiments, when an event generated in the electronic device is recognized while content is being displayed through the highlighted region, the screen control module 230 executes at least one of a function and an application, which are associated with the event, using at least a part of the highlighted region in response to the event. According to certain embodiments, the screen control module 230 configures a region of the display screen corresponding to the function or application associated with the event as at least a part of the highlighted region.

According to certain embodiments, the screen control module 230 operates in one mode among a plurality of modes for performing a partial display function. The plurality of modes includes a first mode (such as reading mode) for adjusting the location, shape, size, or display setting of the highlighted region based on a touch or proximity input associated with the highlighted region and a second mode (such as writing mode) for executing a function or an application corresponding to the touch or proximity input based on the touch or proximity input associated with the highlighted region. According to certain embodiments, the plurality of modes further includes a third mode. In the third mode, at least one of the location, size, shape, and display setting of the highlighted region are dynamically changed, or a function or an application related to at least a part of the content displayed through the highlighted region are executed through the highlighted region, for example, based on a user input for the highlighted region. According to certain embodiments, when the third mode is further included, in the second mode, a function or application related to at least a part of the content displayed in the highlighted region are executed through the highlighted region while the location, size, shape, or display settings of the highlighted region are fixed, unlike the third mode in which the location, size, shape, or display settings of the highlighted region are dynamically changed.

According to certain embodiments, the screen control module 230 selects one of the plurality of modes or change the current set mode (such as the first mode) to another mode (such as the second mode) based on at least one of determined content (such as a web page), designated setting information, an additional user input (such as double touch), and various types of contextual information related to the electronic device (such as information on the most recently executed application).

In the certain embodiments, the display control module 200 includes the content determination module 210, the region setting module 220, and the screen control module 230. Various embodiments are not limited thereto, and the display control module 200 can be implemented to include at least one of the content determination module 210, the region setting module 220, and the screen control module 230 or to include a module performing a different function in addition to the at least one module.

According to various embodiments, an electronic device includes a display for displaying content and a display control module functionally connected to the display, and the display control module is configured to determine the content based on contextual information associated with the electronic device and control the display to display, through one region thereof, at least a part of the content in a higher visibility state than another region thereof.

According to various embodiments, the display includes at least one of an Organic Light-Emitting Diode (OLED), a Liquid-Crystal Display (LCD), and electronic paper (e-paper).

According to various embodiments, the display control module is configured to detect an event related to the electronic device and determine at least one of a function and an application, which are associated with the event, as the at least a part of the content in response to the event. According to various embodiments, the electronic device further includes an environmental information sensor functionally connected to the display control module to measure ambient environment information of the electronic device and to generate an event related to the ambient environment information when the ambient environment information corresponds to a designated condition. According to various embodiments, when the state of the electronic device corresponds to a designated condition, the display control module detects an event related to the state. According to various embodiments, the display control module detects an event related to a call or a message when the electronic device receives the call or the message from an external device.

According to various embodiments, the display control module recognizes a user input associated with the highlighted region and execute a function or an application, which corresponds to the user input, using the highlighted region while the at least a part of the content is being displayed through the highlighted region.

According to various embodiments, the display control module recognizes a user input associated with the highlighted region and dynamically adjust at least one of the location, size, shape, or display setting of the highlighted region and a display attribute of the content based on the user input while the at least a part of the content is being displayed through the highlighted region.

According to various embodiments, the display control module turns off at least some pixels of light emitting devices constituting at least one of the highlighted region and the remaining region or control display of the remaining region to output the same color through the at least some pixels.

According to various embodiments, the contextual information includes an event, a location, time, a battery state, and a running application, which are related to the electronic device, information related to an accessory functionally connected to the electronic device, information related to an external device connected to the electronic device, or information acquired from a sensor functionally connected to the electronic device.

According to various embodiments, the display control module is configured to determine a current date, a day of the week, time, or at least one combination thereof as at least a part of the content when locking is configured to restrict at least some functions of the electronic device.

According to various embodiments, the display control module is configured to refer to information recently updated from a website that provides information (such as news) updated in real time and determine the recently updated information as the at least a part of the content when the website exists in a visit history associated with the electronic device.

According to various embodiments, the display control module is configured to determine the location of the highlighted region based on the contextual information, a designated location, or the user input. According to various embodiments, the user input includes at least one of a proximity input, a touch input, a gesture input, and a gaze input that are associated with the electronic device.

According to various embodiments, the display control module is configured to determine one or more of the shape and the size of the highlighted region based on at least one of the contextual information, information configured in relation to the highlighted region, a user input associated with the electronic device, a display attribute of the content, and a display setting of the highlighted region.

According to various embodiments, the display control module is configured to set the remaining region of the display, except for a region where a blocked content designated by a user is displayed, as the highlighted region when the at least a part of the content is determined to correspond to the blocked content.

According to various embodiments, the display control module is configured to adjust a display setting of the highlighted region based on at least one of the contextual information, information configured in relation to the highlighted region, a user input associated with the electronic device, and a display attribute of the content. According to various embodiments, the display control module is configured to reduce the brightness of the highlighted region when a battery level of the electronic device is lower than a predetermined reference.

According to various embodiments, the display control module is configured to adjust a display attribute of the content based on at least one of the contextual information, information configured in relation to the highlighted region, a user input associated with the electronic device, and a display setting of the highlighted region. According to various embodiments, the display control module is configured to adjust the color, brightness, or size of the content, magnify, reduce, or rotate the content, or reverse the left and the right of the content based on the contextual information.

According to various embodiments, the display control module is configured to recognize an event generated in the electronic device while the at least a part of the content is being displayed through the highlighted region and to execute at least one of a function and an application, which are associated with the event, using at least a part of the highlighted region in response to the event. According to various embodiments, the event includes an event generated in at least one case among a case where ambient environment information measured by a sensor functionally connected to the electronic device corresponds to a first designated condition, a case where state information of the electronic device corresponds to a second designated condition, and a case where the electronic device receives a call or a message from an external device.

According to various embodiments, the display control module controls the display based on at least one of a plurality of modes, and the plurality of modes includes a first mode for executing a function or an application corresponding to a touch or proximity input associated with at least the highlighted region and a second mode for adjusting the location, shape, size, or display setting of the highlighted region based on the touch or proximity input. According to various embodiments, the plurality of modes further includes a third mode for executing a function or an application related to the at least a part of the content displayed through the highlighted region or adjusting the location, shape, size, or display setting of the highlighted region based on the touch or proximity input. According to various embodiments, the display control module is configured to determine one of the plurality of modes based on at least one of the contextual information, the content, designated setting information, or a user input.

Figure 3A:
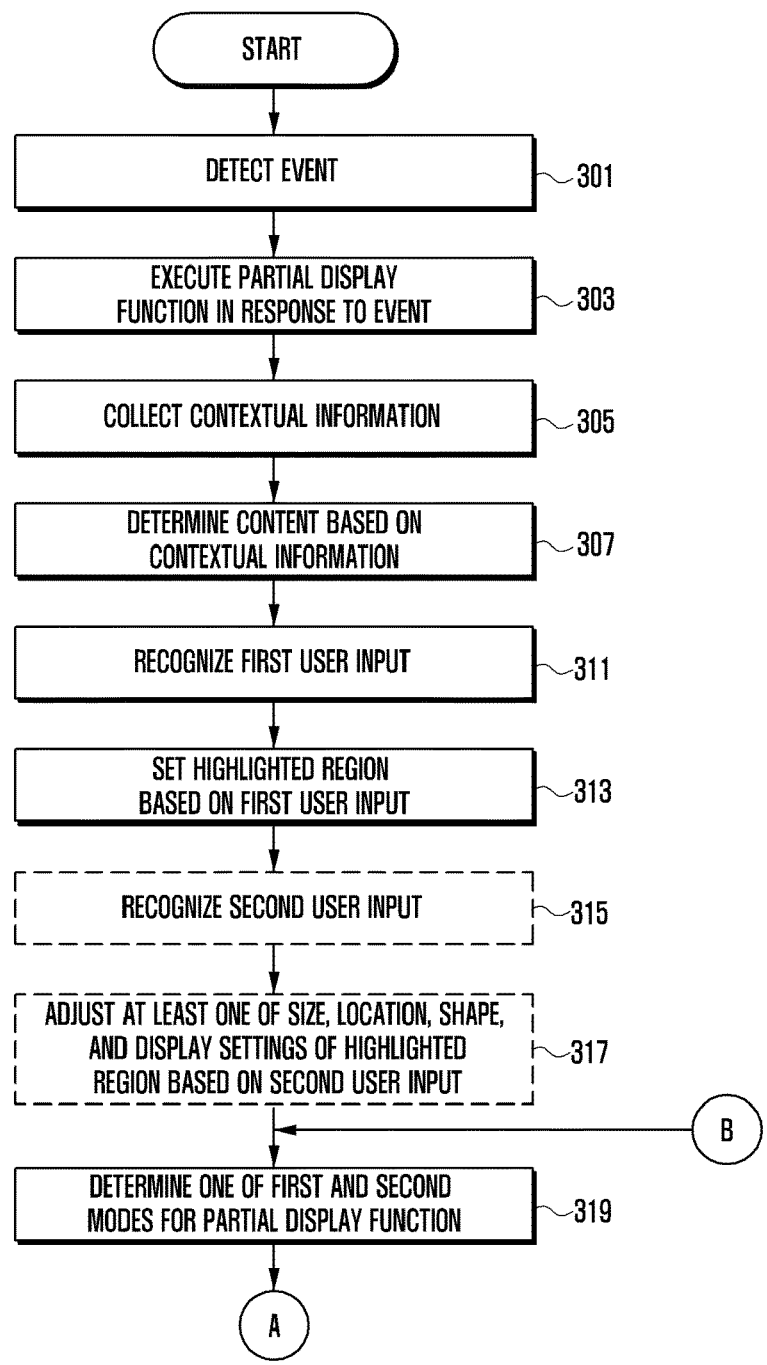
FIGS. 3A and 3B illustrate a process of performing a partial display function in an electronic device according to various embodiments of the present disclosure.
Figure 3B:
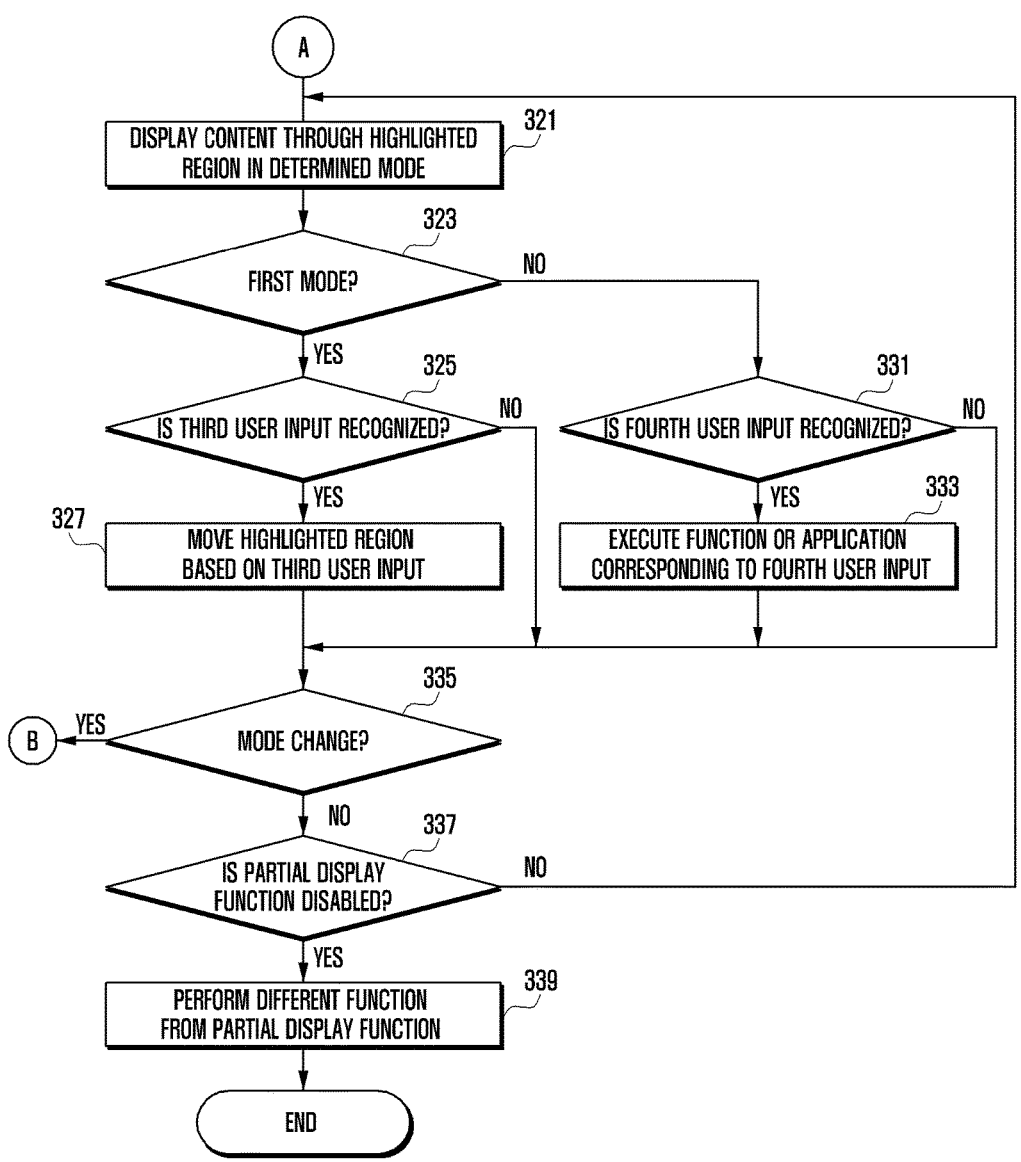

FIGS. 3A and 3B illustrate a process of performing a partial display function in an electronic device according to various embodiments of the present disclosure.

Referring to FIG. 3A, in step 301, the electronic device (such as the display control module 170) detects events generated therein (such as a user input, an alarm, an alert, and notification). In step 303, the electronic device (such as the display control module 170) executes a partial display function in response to a particular event (such as motion of the electronic device) among the events which have been detected in step 301. According to certain embodiments, in step 303, the electronic device (such as the display control module 170) applies power to a display thereof to execute the partial display function, for example, when the display has been turned off.

In step 305, the electronic device (such as the display control module 170) collects contextual information related thereto (such as event related information, location information, time information, battery status information, or information on running applications). In step 307, the electronic device (such as the display control module 170) determines content to display on the basis of the contextual information that has been collected in step 305.

In step 311, the electronic device (such as the display control module 170) recognizes a first user input related thereto (such as a proximity input or touch input for the display screen). In step 313, the electronic device (such as the display control module 170) configures a highlighted region (such as a visible region) based on the first user input which has been recognized in step 311.

In step 315, the electronic device (such as the display control module 170) recognizes a second user input related thereto. In step 317, the electronic device adjusts at least one of the size, location, shape, and display setting of the highlighted region based on the second user input which has been recognized in step 315. According to certain embodiments, at least one of the steps 315 and 317 can be omitted. According to certain embodiments, the second user input is an additional input subsequent to the first user input or at least a part of the first user input. According to certain embodiments, the first and second user inputs can be of the same or different kind. For example, the first user input is a proximity input or touch input for the display screen and the second user input is a gaze input detected by an image sensor functionally connected to the electronic device, and vice versa.

In step 319, the electronic device (such as the display control module 170) determines one of a plurality of modes for the partial display function, for example, a first or second mode. According to certain embodiments, the electronic device (such as the display control module 170) determines one of the plurality of modes based on at least one of, for example, designated setting information (such as the default mode information), an additional user input (such as a proximity input or touch input), and various types of contextual information related to the electronic device (such as information on the most recently executed application). The control flow proceeds from step 319 to step 321 of FIG. 3B via flowchart connector A.

Referring to FIG. 3B, in step 321, the electronic device (such as the display control module 170) displays the content, which has been determined in step 307, through the highlighted region which has been configured in step 313. In step 323, while the content is being displayed through the highlighted region, the electronic device (such as the display control module 170) determines whether the running mode in relation to the partial display function corresponds to the first mode or the second mode.

When the determination result in step 323 shows that the electronic device is in the first mode and the determination result in step 325 shows that the electronic device recognizes a third user input related thereto (such as a proximity movement input, a swipe input, or a gaze movement input), the electronic device (such as the display control module 170) moves the highlighted region (such as the visible region) based on the third user input in step 327. When the determination result in step 323 shows that the electronic device is in the second mode and the determination result in step 331 shows that the electronic device recognizes a fourth user input related thereto (such as a touch input), the electronic device (such as the display control module 170) executes a function or an application corresponding to the fourth user input in step 333. According to certain embodiments, in step 333, the electronic device (such as the display control module 170), for example, displays content connected to a hyperlink at a location corresponding to the fourth user input in a web document displayed through the highlighted region or execute an application connected to an icon at a location corresponding to the fourth user input in a background screen interface displayed through the highlighted region.

In step 335, the electronic device (such as the display control module 170) changes the current mode thereof from the first mode to the second mode or vice versa based on, for example, a fifth user input related thereto. According to certain embodiments, as the electronic device changes the mode thereof, the electronic device repeats the content display process (such as steps 319 to 331) corresponding to the changed mode. When the mode change is made in step 335, the control flow proceeds from step 335 to step 319 of FIG. 3A via flowchart connector B.

When other events related to the electronic device are detected in the operating process (such as steps 303 to 335) according to the partial display function, the electronic device (such as the display control module 170) disables the partial display function in response to a particular event among the other detected events in step 337. In step 339, the electronic device (such as the display control module 170) performs a function different from the partial display function when the partial display function is disabled. For example, the electronic device (such as the display control module 170) displays content through the whole display, turn off the whole display, or configure locking thereof to restrict at least some functions of the electronic device.

The steps (such as steps 301 to 339) in the method illustrated in FIGS. 3A and 3B is performed in a serial, parallel, repetitive, or heuristic manner or in a different sequence from that illustrated in the corresponding drawings. Alternatively, some steps can be omitted, or other steps can be added.

Figure 4:
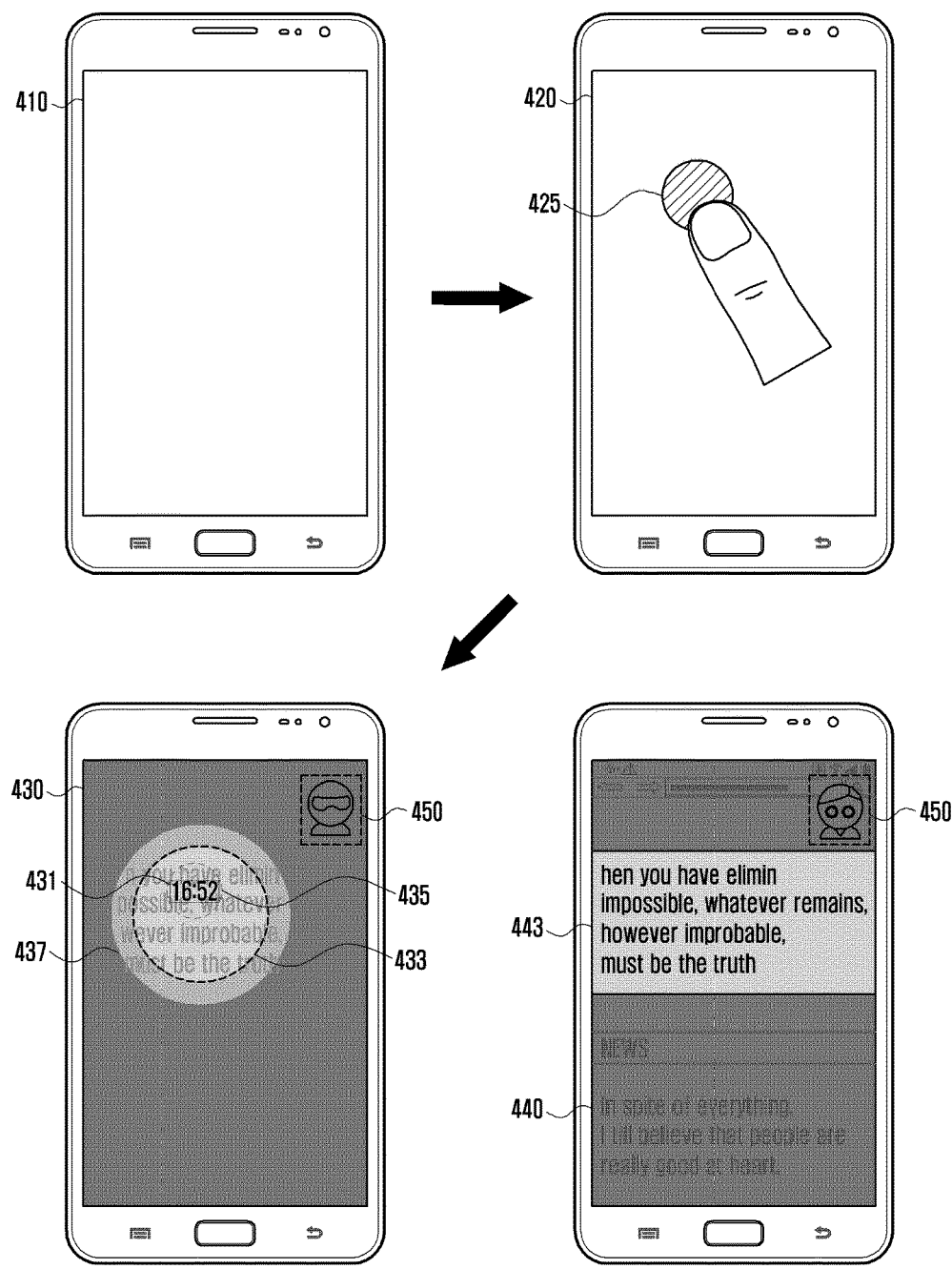
FIG. 4 illustrates screens displayed in the process of providing a partial display function in an electronic device according to various embodiments of the present disclosure.

FIG. 4 illustrates screens 410, 420, and 430 displayed in the process of providing a partial display function in an electronic device according to various embodiments of the present disclosure.

Referring to FIG. 4, according to certain embodiments, the electronic device (such as the electronic device 101) detects an event related thereto, for example, while a display screen (pixels) thereof is turned off as displayed on a screen 410. For example, the electronic device detects motion of the electronic device or motion of holding the electronic device with a user's hand, using a sensor (such as an acceleration sensor) functionally connected thereto, and performs a partial display function in response to the detected motion when the detected motion corresponds to a designated instruction.

According to certain embodiments, in order to provide the partial display function, the electronic device collects contextual information for a setting of a highlighted region. The electronic device recognizes a user input (such as a double touch) for a partial region 425 of the display screen as displayed on a screen 420. The user input includes, for example, a touch input or a proximity input. When the recognized user input corresponds to the designated instruction, the electronic device configures the highlighted region based on the recognized user input. The location of the highlighted region is configured, for example, based on the partial region 425 corresponding to the user input. The shape, size, or display attribute (such as brightness) of the highlighted region is determined, for example, based on at least one of designated setting information, another piece of information related to the user input (such as the proximity distance of the proximity input or the holding time of the proximity or touch input), an additional user input, and various types of contextual information related to the electronic device (such as illumination information, time information, location information, battery status information, and information on a running application).

According to certain embodiments, the electronic device outputs a highlighted region 433 in a higher visibility state than the remaining region of the display screen as displayed on a screen 430. For example, the highlighted region 433 is configured to include at least a part of a partial region 431 corresponding to the user input. According to certain embodiments, the highlighted region 433 is output in a state in which power consumption is reduced compared with before the pixels of the screen are turned off or enter the partial display mode, for example, at a lower brightness (such as about 50% of the brightness before the pixels are turned off).

According to certain embodiments, through at a part of the highlighted region 433, the electronic device displays content (such as current time information 435) determined depending upon a user's contextual information. According to certain embodiments, the electronic device displays information related to the highlighted region 433 as at least a part of the content, for example, a background screen interface portion that corresponds to the highlighted region 433 among the background screen or an application interface portion 437 that corresponds to the highlighted region 433 among the application performed before the pixels of the screen are turned off or enter the partial display mode.

According to certain embodiments, in relation to the highlighted region 433, the electronic device displays the content (such as the current time information 435) determined through a plurality of layers. The plurality of layers includes at least a first layer and a second layer below the first layer. The first layer is, for example, a layer for displaying at least the content (such as the current time information 435). The second layer is a layer for displaying the background screen interface portion which corresponds to the highlighted region 433 among the background screen or the application interface portion 437 that corresponds to the highlighted region 433 among the application performed before the pixels of the screen are turned off or enter the partial display mode. The electronic device overlaps the display of the first layer with that of the second layer to output them based on the hierarchical relation between the plurality of layers.

According to certain embodiments, the electronic device dynamically changes the content displayed in the highlighted region and the location, size, shape, or display setting of the highlighted region, for example, based on an additional user input (such as a double touch) or at least one of various types of contextual information related to the electronic device (such as information on the most recently executed application). In addition, the electronic device adjusts the location, size, shape or display setting of the highlighted region based on the content displayed in the highlighted region. According to certain embodiments, when the content displayed in the highlighted region 433 is changed from the current time information 435 to an Internet document, the electronic device automatically changes the shape of the highlighted region 433 from the previous circular shape to a rectangular shape suitable for document view as displayed on a screen 440.

According to certain embodiments, the electronic device configures a mode related to a method of processing a user input for the highlighted region or change the currently configured mode (such as a first mode) to another mode (such as a second mode) in the process of providing the partial display function, for example, based on at least one of the determined content, the designated setting information, the additional user input (such as double touch), and the various types of contextual information related to the electronic device (such as the information on the most recently executed application).

The electronic device includes, for example, a plurality of modes in which a user input for the highlighted region is processed in different manners. The plurality of modes includes, for example, at least the first mode (such as reading mode) and the second mode (such as writing mode). According to certain embodiments, in the first mode, at least one of the location, size, shape, and display setting of the highlighted region be dynamically changed according to a user input (such as a proximity movement input or a swipe input) for the highlighted region. In the second mode, a function or an application related to at least a part of the content displayed in the highlighted region is executed through the highlighted region according to a user input for the highlighted region (such as a touch input for a part of the content displayed in the highlighted region).

According to certain embodiments, the plurality of modes further includes a third mode. In the third mode, at least one of the location, size, shape, and display setting of the highlighted region is dynamically changed, or a function or an application related to at least a part of the content displayed through the highlighted region is executed through the highlighted region, for example, based on a user input for the highlighted region. According to certain embodiments, when the third mode is further included, a function or application in the second mode related to at least a part of the content displayed in the highlighted region is executed through the highlighted region while the location, size, shape, or display setting of the highlighted region are fixed, unlike the third mode in which the location, size, shape, or display setting of the highlighted region is dynamically changed.

According to certain embodiments, the electronic device display, on a part of the screen (such as on an upper side thereof), an indicator 450 for indicating which of the plurality of modes the current running mode corresponds to.

Figure 5:
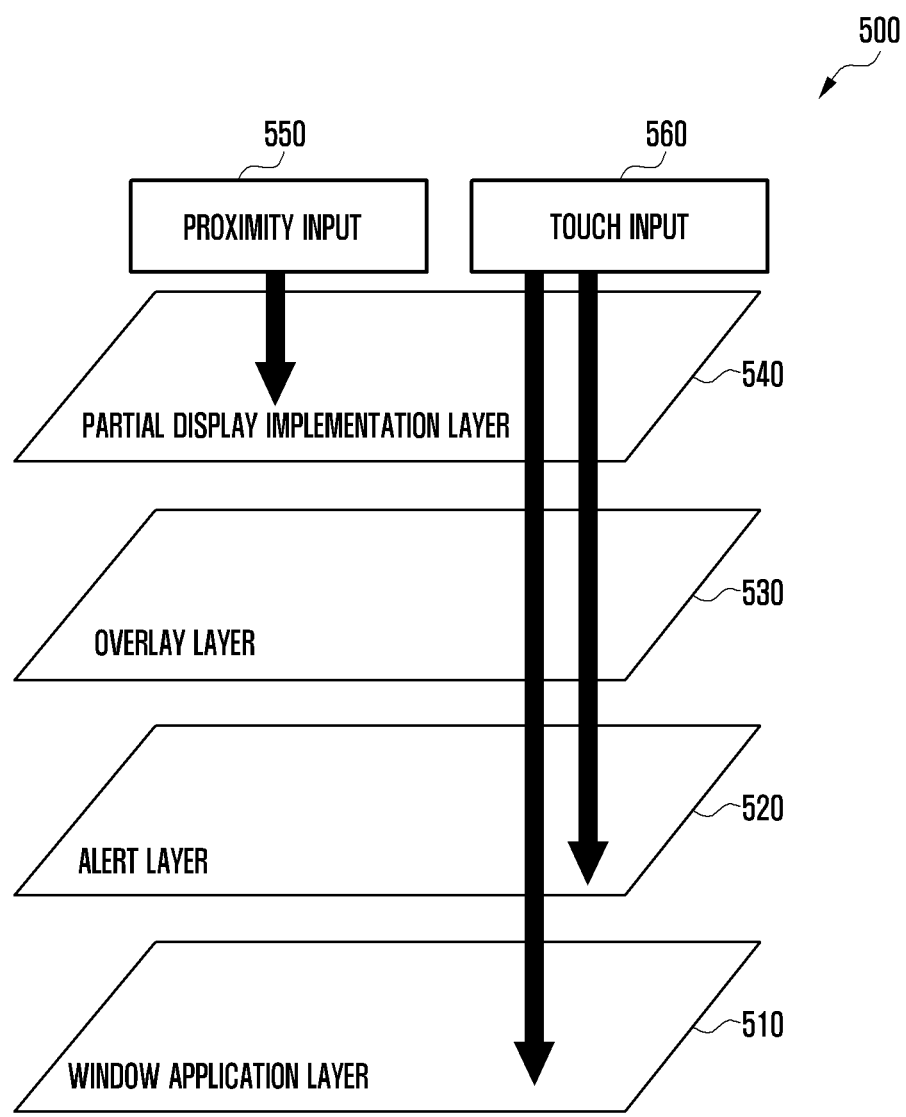
FIG. 5 illustrates a display hierarchical structure for implementing a partial display function of an electronic device according to various embodiments of the present disclosure.

FIG. 5 illustrates a display hierarchical structure 500 for implementing a partial display function of an electronic device according to various embodiments of the present disclosure. Referring to FIG. 5, the display hierarchical structure 500 includes a window application layer 510, an alert layer 520, an overlay layer 530, and a partial display implementation layer 540. At least a part of the layers is implemented, for example, by a software module.

For example, the window application layer 510 is a layer for displaying a screen according to execution of an application. According to certain embodiments, the window application layer 510 includes a plurality of window application layers corresponding to respective applications executed in the electronic device. The plurality of window application layers is disposed at an upper or lower level or at the same level depending upon priorities of the applications.

The alert layer 520 is located over the window application layer 510 to receive an event from the outside or detect an event generated in the electronic device independently of the upper layers. According to certain embodiments, depending upon priorities of events, the alert layer 520 displays a screen corresponding to an event having a higher priority on the application screen displayed on the window application layer 510 in response to the corresponding event. The screen displayed on the alert layer 520 is displayed while being at least partially overlapped with the screen displayed on the window application layer 510.

The overlay layer 530 is located over the window application layer 510 and the alert layer 520 to transfer an event related to the electronic device to the window application layer 510, which is a lower layer for displaying the application screen, without processing the event related to the electronic device.

The partial display implementation layer 540 is located over the overlay layer 530 to perform an operation related to a partial display function using a highlighted region or at least one of the remaining regions (such as an invisible region, a weak visible region, and a power-saving display region) in response to an event related to the partial display function among the events related to the electronic device. According to certain embodiments, based on a user input, for example a proximity input 550 or a touch input 560, corresponding to a partial region of a display screen, the partial display implementation layer 540 configures a highlighted region to include the partial region corresponding to the user input. For example, the partial display implementation layer 540 transparently processes the part corresponding to the highlighted region or opaquely processes the rest of the display screen except for the highlighted region. The partial display implementation layer 540 outputs visual representation related to the partial display function on the part corresponding to the user input (such as the proximity input 550 or the touch input 560) or the highlighted region. The partial display implementation layer 540 covers the whole display screen, and for a locking function, turns off at least a part of the display screen, covers it with a screen displayed in one color (such as black), or displays it in a low visibility state.

Figure 6:
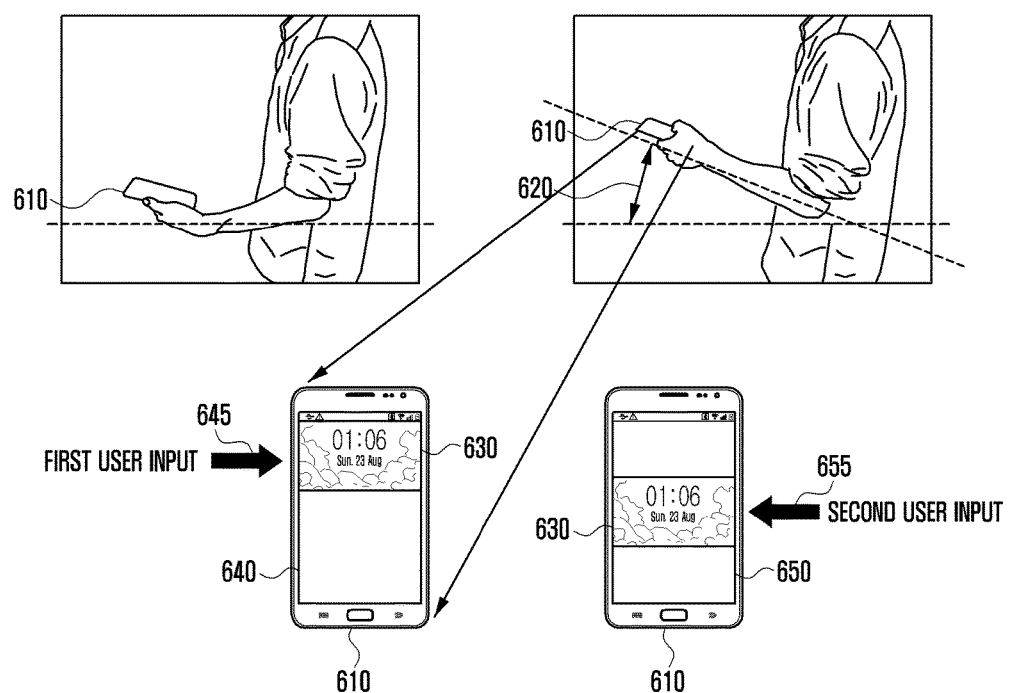
FIG. 6 illustrates a process of configuring a highlighted region in an electronic device according to various embodiments of the present disclosure.

FIG. 6 illustrates a process of configuring a highlighted region in an electronic device 610 according to various embodiments of the present disclosure.

Referring to FIG. 6, the electronic device 610 (such as the electronic device 101) detects a user's motion related thereto as at least a part of an event for performance of a partial display function using a sensor (such as an acceleration sensor) functionally connected to the electronic device 610. According to certain embodiments, the electronic device 610 detects a motion 620 thereof according to the user's motion of lifting an arm holding the electronic device 610.

According to certain embodiments, the electronic device 610 displays content (such as current time information) through a highlighted region for a partial display function in response to the motion 620 thereof. The location of the highlighted region 630 is determined based on at least one of preset information and a first user input 645 (such as a proximity input, a touch input, or a gaze input) as displayed on a screen 640, or is dynamically changed based on a second user input 655 (such as a proximity movement input, a swipe input, or a gaze movement input) as displayed on a screen 650.

Figure 7:
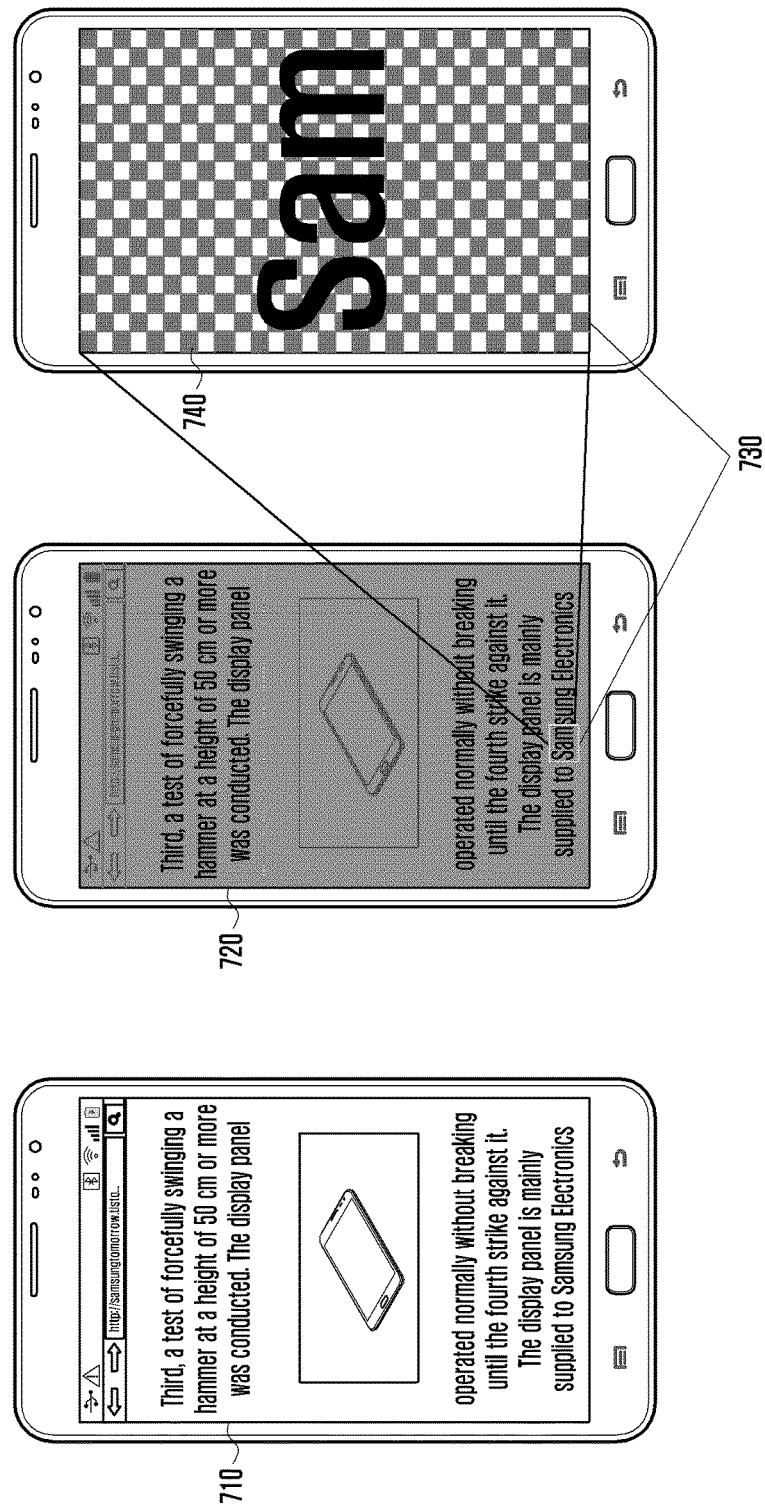
FIG. 7 illustrates a power-saving display screen of an electronic device according to various embodiments of the present disclosure.

FIG. 7 illustrates a power-saving display screen 720 of an electronic device according to various embodiments of the present disclosure. Referring to FIG. 7, the power-saving display screen 720 is displayed in a lower visibility state than a typical display screen 710.

According to certain embodiments, in order to reduce power consumption, the power-saving display screen 720 is superposed on content and outputs in a form 730 in which pixels 740 in the same color (such as black) are arranged in a grid pattern. For example, the power-saving display screen 720 is displayed using a plurality of layers including a first layer for displaying content and a second layer located over the first layer to output the same color (such as black) in a grid pattern. The experimental result associated with the power-saving display screen 720 shows that the power-saving display screen 720 is displayed with low power as long as screen tearing is not generated when a user beyond a designated range from the power-saving display screen 720 (such as at a distance of about 34 cm or more therefrom) gazes at the power-saving display screen 720. In certain embodiments, The power-saving display screen 720 is configured such that at least some pixels thereof are turned off or output the same color (such as black).

According to certain embodiments, such a display method applied to the power-saving display screen 720 is applied to the remaining region (such as the power-saving display region) except for the highlighted region for the partial display function, and also is applied to at least a part of the highlighted region in some cases.

Table 1 shows power consumption of Active-Matrix Organic Light-Emitting Diode (AMOLED) display based electronic devices (such as device A and device B) when a predetermined voltage (about 4 V) is applied thereto and the background color thereof is white or black.

TABLE 1

| Device | Default | | | Max | | |
| --- | --- | --- | --- | --- | --- | --- |
| | Luminance | White | Black | Luminance | White | Black |
| A | 160 cd | 892 mW | 264 mW | 335 cd | 1824 mW | 264 mW |
| B | 139 cd | 1080 mW | 624 mW | 298 cd | 1708 mW | 624 mW |

Referring to Table 1 above, the device A according to one example consumed power of about 264 mW when the background color thereof was black in the fundamental state (a luminance of about 160 cd) and power of about 892 mW, about 3.4 times power consumption in the case of the black background, when the background color thereof was white. The device A according to one example consumed the same power of about 264 mW as in the fundamental state when the background color thereof was black in the maximum luminance state (a luminance of about 335 cd) and power of 1824 mW, about 6.9 times power consumption in the case of the black background, when the background color thereof was white.

The device B according to another example consumed power of about 624 mW when the background color thereof is black in the fundamental state (a luminance of about 139 cd) and power of about 1080 mW, about 1.7 times power consumption in the case of the black background, when the background color thereof was white. The device B according to the other example consumed the same power of about 624 mW as in the fundamental state when the background color thereof was black in the maximum luminance state (a luminance of about 298 cd) and power of 1708 mW, about 2.7 times power consumption in the case of the black background, when the background color thereof was white.

In Table 1, the electronic devices using the AMOLED display consumed about 1.7 to 6.9 times more power when using the white background than when using the black background. According to certain embodiments, when displaying the screen of the remaining region except for a highlighted region using one color, the AMOLD display based electronic devices uses black to relatively reduce power consumption. According to certain embodiments, the AMOLD display based electronic devices uses black as the background color of the highlighted region to relatively reduce power consumption.

Although the power-saving effect relevant to the AMOLED display has been exemplified above, another type of display panel (such as a Liquid Crystal Display (LCD) or a Light Emitting Diode (LED)) having a drive principle similar to that of the AMOLED display can also exhibit the same or similar effect. This is only an exemplary embodiment, and the present disclosure is not limited to the embodiment.

Figure 8:
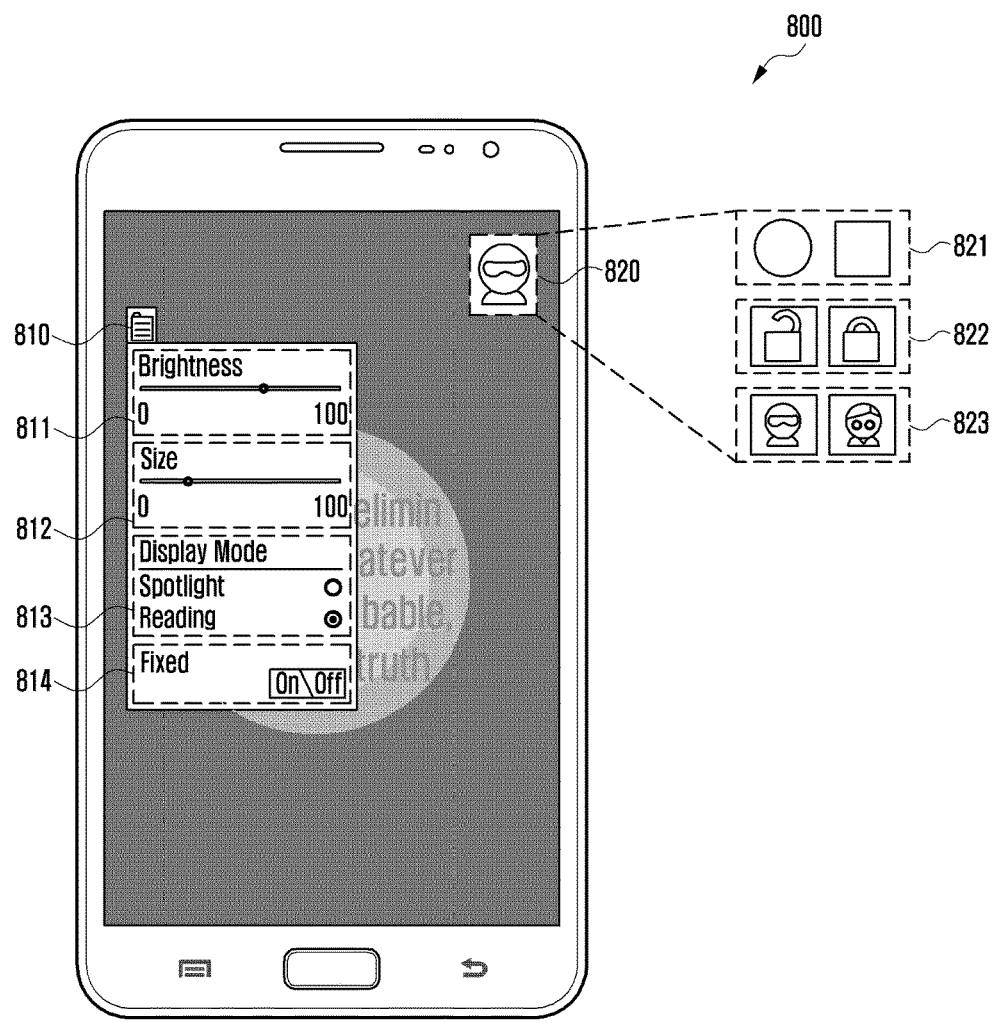
FIG. 8 illustrates a user input interface for adjusting a highlighted region in an electronic device according to various embodiments of the present disclosure.

FIG. 8 illustrates a user input interface 800 for adjusting a highlighted region in an electronic device according to various embodiments of the present disclosure. Referring to FIG. 8, the user input interface 800 includes a setting menu 810 for designating setting information related to a partial display function and an indicator 820 for visually representing the setting information related to the partial display function.

According to certain embodiments, through the setting menu 810, a user manually designates, for example, the display attribute 811 (such as brightness) and the size 812 of a highlighted region, the mode 813 related to the partial display function, or setting information 814 as to whether the highlighted region is fixed.

According to certain embodiments, the indicator 820 includes a first image group 821 for representing the shape of the highlighted region, a second image group 822 for representing whether the highlighted region is fixed, and a third image group 823 for representing the mode related to the partial display function. According to certain embodiments, the indicator 820 is displayed in the form in which one of the images pertaining to the first to third image groups 821 to 823 is disposed at a side (such as upper side) edge of a display screen.

Figure 9:
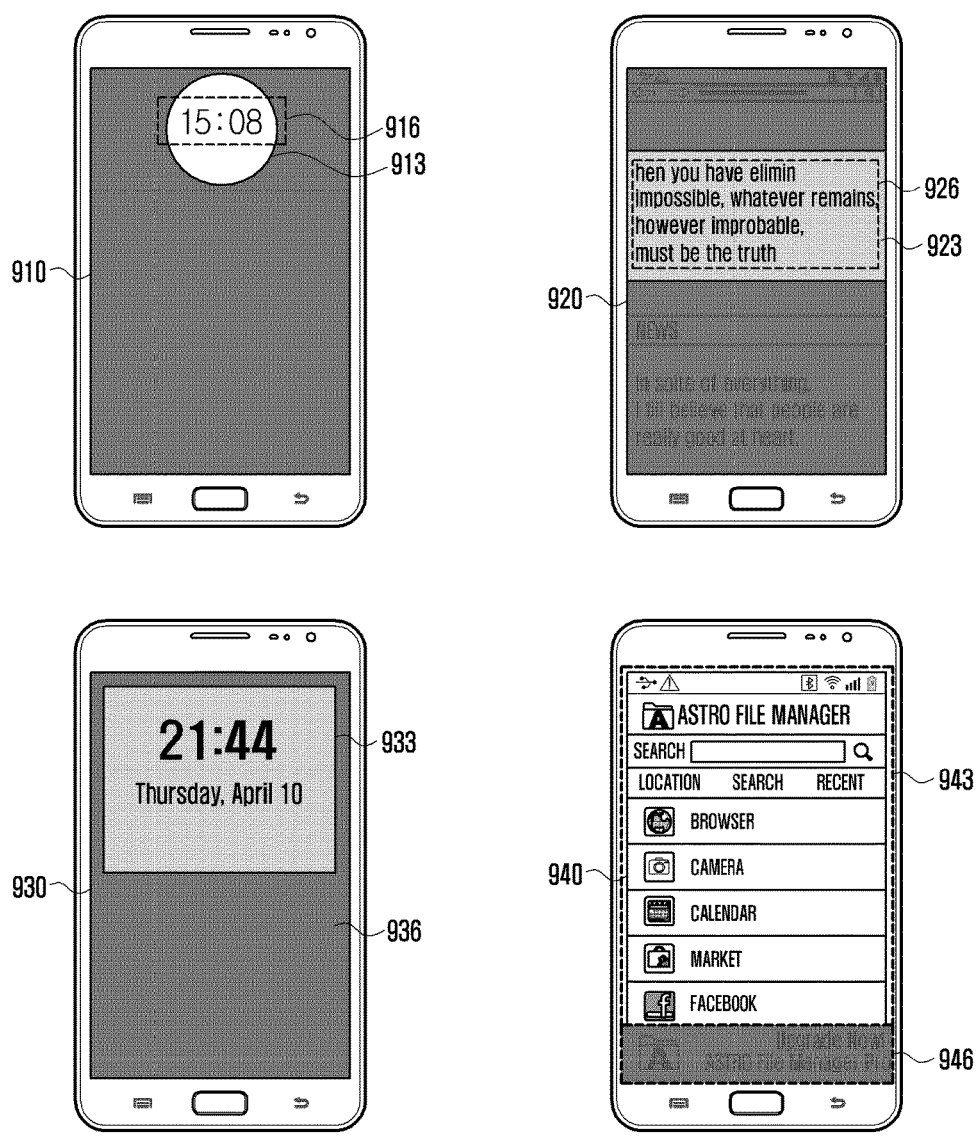
FIG. 9 illustrates screens providing a partial display function in an electronic device according to various embodiments of the present disclosure.

FIG. 9 illustrates screens 910, 920, 930, and 940 providing a partial display function in an electronic device according to various embodiments of the present disclosure.

Referring to FIG. 9, for power-saving, malfunction prevention, or security, locking is configured to restrict at least some functions of the electronic device (such as a screen display function or a function of receiving a proximity or touch input related to a screen). According to certain embodiments, when the electronic device is locked, the electronic device turns off the display screen thereof or outputs, through the display, a screen for informing that the electronic device is in the locked state. According to certain embodiments, when a partial display function is executed in response to an event generated while the electronic device is locked, the electronic device determines information related to a current time point (such as the current date, a day of the week, time, or at least one combination thereof) as at least a part of content. The electronic device displays information 916 related to the current time point (such as current time, date, or day of the week) through a highlighted region 913 for the partial display function as displayed on a screen 910.

According to certain embodiments, the electronic device collects, for example, information on a visit history thereof to websites as at least a part of contextual information related thereto. In order to collect the information on the history of visit to websites, the electronic device stores information on a visit to websites in a storage medium (such as an internal memory, an external memory, or a hard disc drive) functionally connected thereto or receive it from an external server every time the electronic device visits the websites. According to certain embodiments, in order to provide a partial display function, the electronic device determines, for example, whether a designated website is included in the visit history of the electronic device to websites, in response to a particular event. When a website providing real-time updated information (such as news) exists in the history of visit to websites, the electronic device acquires recently updated information from the corresponding website and determine it as at least a part of content. The electronic device displays at least a part of the recently updated information 926 through a highlighted region 923 for the partial display function as displayed on a screen 920.

According to certain embodiments, when the battery level of the electronic device is lower than a threshold value or the electronic device is configured by a user to operate in the power-saving mode, the electronic device reduces power required for the partial display function. As displayed on a screen 930, in order to reduce the power required for the partial display function, the electronic device displays a highlighted region 933 for the partial display function in the state in which power consumption is reduced as compared with the typical screen display state. According to certain embodiments, when each pixel constituting the display screen of the electronic device is configured with a combination of multi-colored sub-pixels (such as Red-Green-Blue (RGB) or Red-Green-Blue-White (RGBW)), the electronic device turn on only the sub-pixel corresponding to at least one color among the sub-pixels of each pixel corresponding to the highlighted region to reduce power consumption for the highlighted region. According to certain embodiments, in order to reduce power consumption related to the partial display function, the electronic device controls the display state of the remaining region 936 except for the highlighted region 933 through a method of turning off the corresponding pixels of the remaining region 936, so that power consumption for the remaining region is rarely generated.

According to certain embodiments, the electronic device monitors in real time whether at least a part of content to be displayed on the display screen corresponds to blocked content (such as harmful content, spam content, or advertising content) designated by a user. When it is determined that at least a part of the content to be displayed on the display screen corresponds to blocked content, the electronic device self-generates an event related to the blocked content for performance of a partial display function. In response to the event related to the blocked content, the electronic device performs the partial display function to prevent the blocked content from being displayed. As displayed on a screen 940, the electronic device configures the remaining region of the display screen, except for a region 946 where blocked content is displayed, as a highlighted region 943 for a partial display function to display the rest of content to be displayed, except for the blocked content, through the highlighted region 943.

Figure 10:
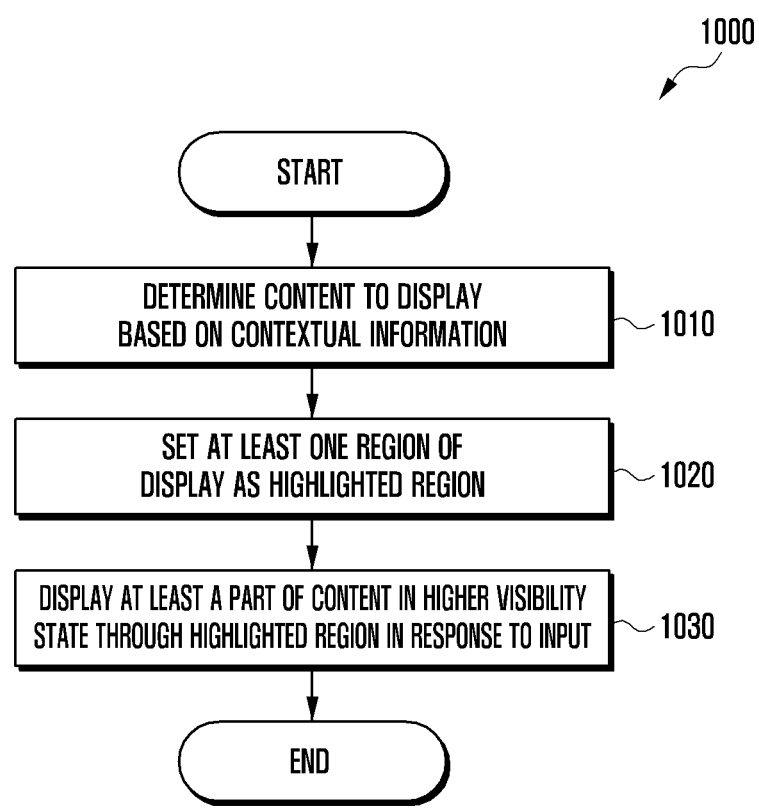
FIG. 10 is a flowchart illustrating a display control method according to various embodiments of the present disclosure.

FIG. 10 illustrates a display control method 1000 according to various embodiments of the present disclosure.

In step 1010, the electronic device (such as the content determination module 210) determines content to display to the outside on the basis of contextual information related thereto. In step 1020, the electronic device (such as the region setting module 220) configures at least one region of the display screen thereof as a highlighted region. In step 1030, in response to an input, the electronic device (such as the screen control module 210) controls a display to display, through the highlighted region configured in step 1020, at least a part of content in a higher visibility state than the remaining region of the display screen except for the highlighted region. The steps performed by the method illustrated in FIG. 10 can be performed in a serial, parallel, repetitive, or heuristic manner or in a different sequence from that illustrated in the corresponding drawings. Alternatively, some steps can be omitted, or other steps can be added.

According to various embodiments, a display control method includes determining content to display to the outside of an electronic device based on contextual information associated with the electronic device, configuring one region of a display functionally connected to the electronic device as a highlighted region and displaying, through the highlighted region, at least a part of the content in a higher visibility state than the remaining region of the display except for the highlighted region in response to an input.

According to various embodiments, the contextual information includes an event, a location, time, a battery state, and a running application, which are related to the electronic device, information related to an accessory functionally connected to the electronic device, information related to an external device connected to the electronic device, or information acquired from a sensor functionally connected to the electronic device.

According to various embodiments, the determining of the content includes determining at least one of functions or applications associated with an event relevant to the electronic device as at least a part of the content in response to the event.

According to various embodiments, the event includes an event generated in at least one case among a case where ambient environment information measured by a sensor functionally connected to the electronic device corresponds to a first designated condition, a case where state information of the electronic device corresponds to a second designated condition, and a case where the electronic device receives a call or a message from an external device.

According to various embodiments, the determining of the content includes determining a current date, a day of the week, time, or at least one combination thereof as at least a part of the content when locking is configured to restrict at least some functions of the electronic device.

According to various embodiments, the determining of the content includes acquiring recently updated information from a website that provides information updated in real time when the website exists in a visit history associated with the electronic device and determining the recently updated information as the at least a part of the content.

According to various embodiments, the configuring of the region of the display functionally connected to the electronic device as the highlighted region includes determining the location of the highlighted region based on the contextual information, a designated location, or the user input.

According to various embodiments, the user input includes at least one of a proximity input, a touch input, a gesture input, and a gaze input that are associated with the electronic device.

According to various embodiments, the configuring of the region of the display functionally connected to the electronic device as the highlighted region includes determining one or more of the shape and the size of the highlighted region based on at least one of the contextual information, information configured in relation to the highlighted region, a user input associated with the electronic device, a display attribute of the content, and a display setting of the highlighted region.

According to various embodiments, the configuring of the region of the display functionally connected to the electronic device as the highlighted region includes configuring the remaining region of the display, except for a region where a blocked content designated by a user is displayed, as the highlighted region when the at least a part of the content is determined to correspond to the blocked content.

According to various embodiments, the displaying of the at least a part of the content includes adjusting a display setting of the highlighted region based on at least one of the contextual information, information configured in relation to the highlighted region, a user input associated with the electronic device, and a display attribute of the content.

According to various embodiments, the adjusting of the display setting includes reducing the brightness of the highlighted region when a battery level of the electronic device is lower than a predetermined reference.

According to various embodiments, the adjusting of the display setting includes controlling the display to turn off at least some of multiple light emitting devices constituting the highlighted region.

According to various embodiments, the displaying of the at least a part of the content includes adjusting a display attribute of the content based on at least one of the contextual information, information configured in relation to the highlighted region, a user input associated with the electronic device, and a display setting of the highlighted region.

According to various embodiments, the displaying of the at least a part of the content includes adjusting the color, brightness, or size of the content, magnifying, reducing, or rotating the content, or reversing the left and the right of the content based on the contextual information.

According to various embodiments, the displaying of the at least a part of the content include recognizing at least one of a touch input, a proximity input, and a gaze input, which are associated with the highlighted region, while the at least a part of the content is being displayed through the highlighted region, and executing a function or an application corresponding to the input using the highlighted region.

According to various embodiments, the displaying of the at least a part of the content includes recognizing at least one of a proximity movement input, a swipe input, and a gaze movement input, which are associated with the highlighted region, while the at least a part of the content is being displayed through the highlighted region, and moving the highlighted region based on the input.

According to various embodiments, the displaying of the at least a part of the content includes recognizing a user input associated with the electronic device while the at least a part of the content is being displayed through the highlighted region and adjusting at least one of the size and the shape of the highlighted region based on the user input.

According to various embodiments, the displaying of the at least a part of the content includes turning off at least some pixels in the remaining region or controlling display of the remaining region to output the same color through the at least some pixels.

According to various embodiments, the controlling of the display of the remaining region includes controlling the display of the remaining region such that the at least some pixels and the remaining pixels except for the at least some pixels in the remaining region form a grid pattern.

According to various embodiments, the displaying of the at least a part of the content includes recognizing an event generated in the electronic device while the at least a part of the content is being displayed through the highlighted region and executing at least one of a function and an application, which are associated with the event using at least a part of the highlighted region in response to the event.

According to various embodiments, the event includes an event generated in at least one case among a case where ambient environment information measured by a sensor functionally connected to the electronic device corresponds to a first designated condition, a case where state information of the electronic device corresponds to a second designated condition, and a case where the electronic device receives a call or a message from an external device.

According to various embodiments, the displaying of the at least a part of the content is based on at least one of a plurality of modes, and the plurality of modes includes a first mode for executing a function or an application corresponding to a touch or proximity input associated with at least the highlighted region and a second mode for adjusting the location, shape, size, or display setting of the highlighted region based on the touch or proximity input.

According to various embodiments, the plurality of modes further includes a third mode for executing a function or an application related to the at least a part of the content displayed through the highlighted region or adjusting the location, shape, size, or display setting of the highlighted region based on the touch or proximity input.

According to various embodiments, the displaying of the at least a part of the content includes determining one of the plurality of modes based on at least one of the contextual information, the content, designated setting information, or a user input.

Figure 11:
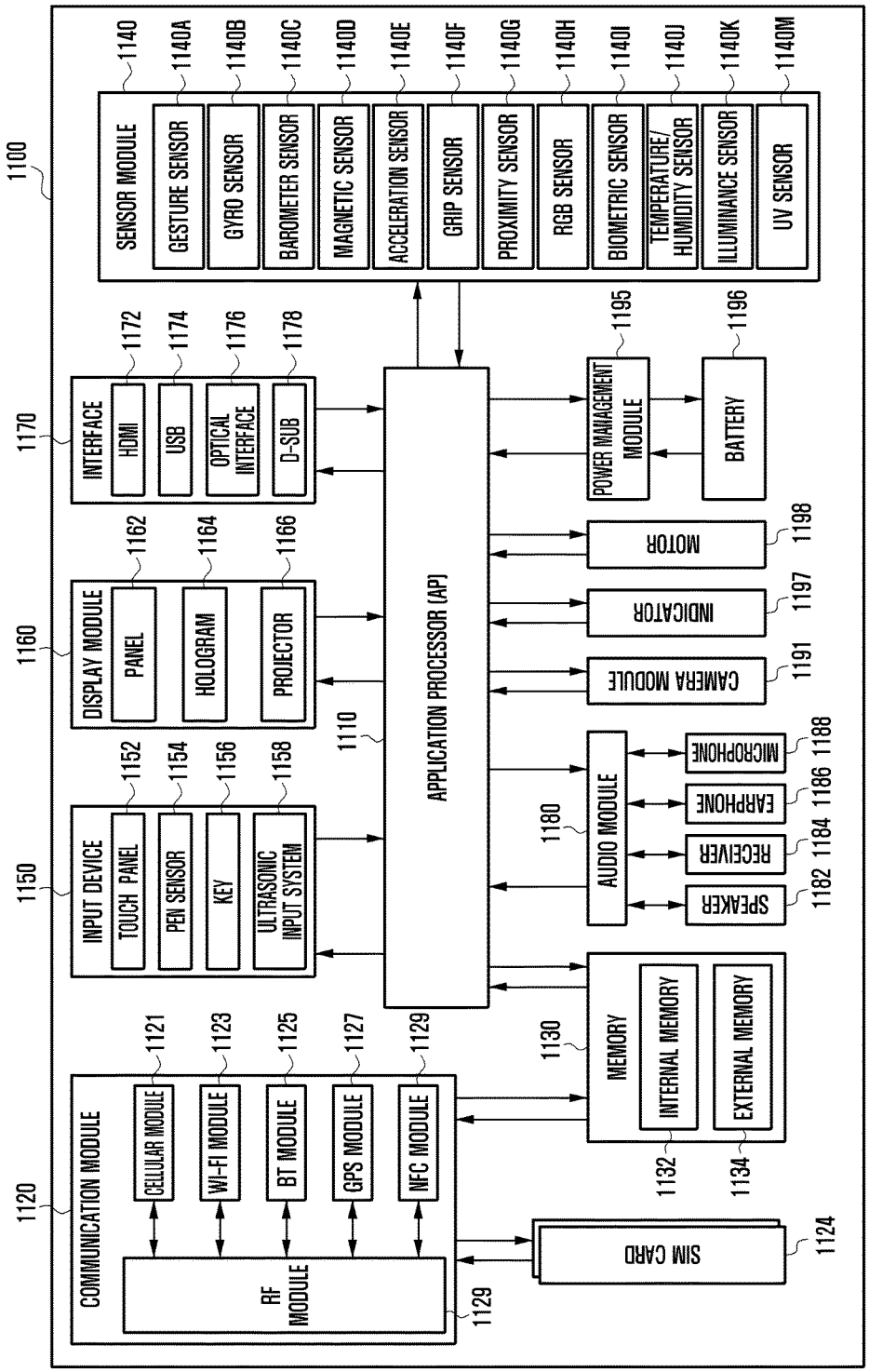
FIG. 11 illustrates an electronic device according to various embodiments of the present disclosure.

FIG. 11 illustrates a configuration of the electronic device according to various embodiments of the present disclosure. The electronic device 1101 can be of the whole or a part of the electronic device 101. Referring to FIG. 11, the electronic device 1101 includes an Application Processor (AP) 1110, a communication module 1120, a Subscriber Identity Module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 operates an Operating System (OS) or application programs to control a plurality of hardware or software components connected to the AP 1110 and performs data-processing and operations on multimedia data. For example, the AP 1110 is implemented in the form of System on Chip (SoC). According to certain embodiments, the AP 1110 includes a Graphic Processing Unit (GPU) (not shown).

The communication module 1120 (such as the communication interface 160) performs data communication with other electronic devices (such as the electronic device 104 and server 106) through a network. According to certain embodiments, the communication module 1120 includes a cellular module 1121, a Wi-Fi module 1123, a BT module 1125, a GPS module 1127, an NFC module 1128, and a Radio Frequency (RF) module 1129.

The cellular module 1121 is responsible for voice and video communication, text messaging, and Internet access services through a communication network (such as LTE, LTE-A, CDMA, WCDMA, UMTS, WiBro, and GSM networks). The cellular module 1121 performs identification and authentication of electronic devices in the communication network using the SIM card 1124. According to certain embodiments, the cellular module 1121 performs at least one of the functions of the AP 1110. For example, the cellular module 1121 performs at least a part of the multimedia control function.

According to certain embodiments, the cellular module 1121 includes a Communication Processor (CP). The cellular module 1121 is implemented in the form of SOC. Although the cellular module 1121 (such as a communication processor), the memory 1130, and the power management module 1195 are depicted as independent components separated from the AP 1110, the present disclosure is not limited thereto but can be embodied in a way that the AP includes at least one of the components (such as the cellular module 1121).

According to certain embodiments, each of the AP 1110 and the cellular module 1121 (such as a communication processor) loads a command or data received from at least one of the components on a non-volatile or volatile memory and processes the command or data. The AP 1110 or the cellular module 1121 stores the data received from other components or generated by at least one of other components in the non-volatile memory.

Each of the Wi-Fi module 1123, the BT module 1125, the GPS module 1127, and the NFC module 1128 includes a processor for processing the data it transmits or receives. Although the cellular module 1121, the Wi-Fi module 1123, the BT module 1125, the GPS module 1127, and the NFC module 1128 are depicted as independent blocks; at least two of them (such as a communication processor corresponding to the cellular module 1121 and Wi-Fi processor corresponding to the Wi-Fi module 1123) are integrated in the form of SoC.

The RF module 1129 is responsible for data communication, such as transmitting or receiving RF signals. Although not depicted, the RF module 1129 includes a transceiver, a Power Amp Module (PAM), a frequency filter, and a Low Noise Amplifier (LNA). The RF module 1129 also include the elements for transmitting or receiving electric wave in free space, such as a conductor or conductive wire. Although FIG. 11 illustrates the Wi-Fi module 1123, the BT module 1125, the GPS module 1127, and the NFC module 1128 are sharing the RF module 1129, the present disclosure is not limited thereto but can be embodied in a way that at least one of the Wi-Fi module 1123, the BT module 1125, the GPS module 1127, and the NFC module 1128 transmits or receives RF signals through an independent RF module.

The SIM card 1124 is designed so as to be inserted into a slot formed at a predetermined position of the electronic device. The SIM card 1124 stores unique identity information (such as an Integrated Circuit Card Identifier (ICCID)) or subscriber information (such as an International Mobile Subscriber Identity (IMSI)).

The memory 1130 (such as the memory 130) includes at least one of the internal memory 1132 and an external memory 1134. The internal memory 1132 includes at least one of a volatile memory (such as Dynamic Random Access Memory (DRAM), Static RAM (SRAM), Synchronous Dynamic RAM (SDRAM) or a non-volatile memory (such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to certain embodiments, the internal memory 1132 is a Solid State Drive (SSD). The external memory 1134 is a flash drive such as Compact Flash (CF), Secure Digital (SD), micro-SD, Mini-SD, extreme Digital (xD), and Memory Stick. The external memory 1134 is connected to the electronic device 1101 through various interfaces functionally. According to certain embodiments, the electronic device 1101 includes a storage device (or storage medium) such as hard drive.

The sensor module 1140 measures a physical quantity or checks the operation status of the electronic device 1101 and converts the measured or checked information to an electric signal. The sensor module 1140 includes at least one of gesture sensor 1140A, Gyro sensor 1140B, barometric sensor 1140C, magnetic sensor 1140D, acceleration sensor 1140E, grip sensor 1140F, proximity sensor 1140G, color sensor 1140H (such as a Red, Green, Blue (RGB) sensor), bio sensor 1140I, temperature/humidity sensor 1140J, illuminance sensor 1140K, and Ultra Violet (UV) sensor 1140M. The sensor module 1140 includes E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 1140 further includes a control circuit for controlling at least one of the sensors included therein.

The input device 1150 includes a touch panel 1152, a (digital) pen sensor 1154, keys 1156, and an ultrasonic input device 1158. The touch panel 1152 is one of capacitive, resistive, infrared, or microwave type touch panel. The touch panel 1152 includes a control circuit. In the case of the capacitive type touch panel, it is possible to detect physical contact or approximation. The touch panel 1152 further includes a tactile layer. In certain embodiments, the touch panel 1152 provides the user with haptic reaction.

The (digital) pen sensor 1154 is implemented with a sheet with the same or similar way as touch input of the user or a separate recognition sheet. The keys 1156 includes physical buttons, optical key, and keypad. The ultrasonic input device 1158 is a device capable of checking data by detecting sound wave through a microphone 1188 and is implemented for wireless recognition. According to certain embodiments, the electronic device 1101 receives the user input made by means of an external device (such as a computer or server) connected through the communication module 1120.

The display 1160 (such as the display module 150) includes a panel 1162, a hologram device 1164, and a projector 1166. The panel 1162 is a Liquid Crystal Display (LCD) panel or an Active Matrix Organic Light Emitting Diodes (AMOLED) panel. The panel 1162 bise implemented so as to be flexible, transparent, or wearable. The panel 1162 is implemented as a module integrated with the touch panel 1152. The hologram device 1164 presents 3-dimentional image in the air using interference of light. The projector 1166 projects an image to a screen. The screen is placed inside or outside the electronic device. According to certain embodiments, the display 1160 includes a control circuit for controlling the panel 1162, the hologram device 1164, and the projector 1166.

The interface 1170 includes a High-Definition Multimedia Interface (HDMI) 1172, a Universal Serial Bus (USB) 1174, an optical interface 1176, and a D-subminiature (D-sub) 1178. The interface 1170 includes the communication interface 160 as shown in FIG. 1. The interface 1170 includes a Mobile High-definition Link (MHL) interface, a SD/MMC card interface, and infrared Data Association (irDA) standard interface.

The audio module 1180 converts sound to electric signal and vice versa. At least a part of the audio module 1180 is included in the input/output interface 140 as shown in FIG. 1. The audio module 1180 processes the audio information input or output through the speaker 1182, the receiver 1184, the earphone 1186, and the microphone 1188.

The camera module 1191 is a device capable of taking still and motion pictures and, according to certain embodiments, includes at least one image sensor (such as front and rear sensors), a lens (not shown), and Image Signal Processor (ISP) (not shown), and a flash (such as an LED or xenon lamp) (not shown).

The power management module 1195 manages the power of the electronic device 1101. Although not shown, the power management module 1195 includes a Power Management Integrated Circuit (PMIC), a charger Integrated Circuit (IC), a battery, and a battery or fuel gauge.

The PMIC is integrated into an integrated circuit or SoC semiconductor. The charging is classified into wireless charging and wired charge. The charger IC charges the battery and protect the charger against overvoltage or overcurrent. According to certain embodiments, the charger IC includes at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge measures the residual power of the battery 1196, charging voltage, current, and temperature. The battery 1196 stores or generates power and supplies the stored or generated power to the electronic device 1101. The battery 1196 includes a rechargeable battery or a solar battery.

The indicator 1197 displays operation status of the electronic device 1101 or a part of the electronic device, booting status, messaging status, and charging status. The motor 1198 converts the electronic signal to mechanical vibration. Although not shown, the electronic device 1101 includes a processing unit (such as a GPU) for supporting mobile TV. The processing unit for supporting the mobile TV is able to processing the media data abiding by the broadcast standards such Digital Multimedia Broadcasting (DMB), Digital Video Broadcasting (DVB), and media flow.

The above enumerated components of the electronic device of the present disclosure can be implemented into one or more parts, and the names of the corresponding components can be changed depending on the kind of the electronic device. The electronic device of the present disclosure includes at least one of the aforementioned components with omission or addition of some components. The components of the electronic device of the present disclosure can be combined selectively into an entity to perform the functions of the components equally as before the combination.

Figure 12:
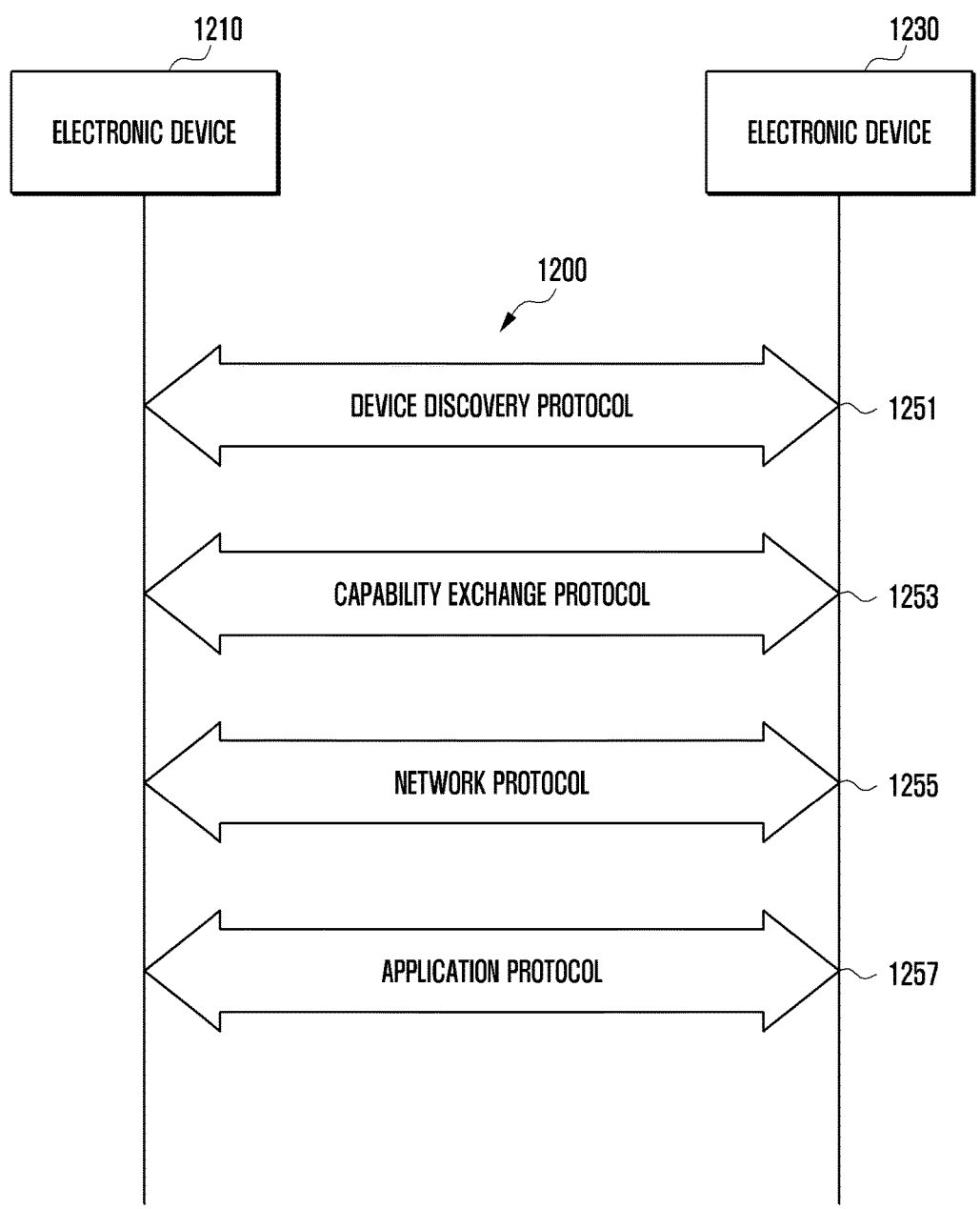
FIG. 12 illustrates a communication protocol between a plurality of electronic devices according to various embodiments of the present disclosure.

FIG. 12 illustrates a communication protocol 1200 between a plurality of electronic devices (such as electronic devices 1210 and 1230) according to various embodiments of the present disclosure. Referring to FIG. 12, the communication protocol 1200 includes, for example, a device discovery protocol 1251, a capability exchange protocol 1253, a network protocol 1255, and an application protocol 1257.

According to certain embodiments, the device discovery protocol 1251 is a protocol that allows the electronic devices (such as the electronic devices 1210 and 1230) to detect an external electronic device capable of communicating therewith or connect the detected external electronic device thereto. For example, using the device discovery protocol 1251, the electronic device 1210 detects the electronic device 1230 as a device that communicates therewith, through a communication method (such as Wi-Fi, BT, or USB) that is used in the electronic device 1210. For communication with the electronic device 1230, the electronic device 1210 acquires and stores identification information on the detected electronic device 1230 using the device discovery protocol 1251. For example, the electronic device 1210 establishes the communication with the electronic device 1230 based on at least the identification information.

According to certain embodiments, the device discovery protocol 1251 is a protocol for mutual authentication between the plurality of electronic devices. For example, the electronic device 1210 performs authentication between the electronic devices 1210 and 1230 based on communication information (such as a Media Access Control (MAC) address, a Universally Unique IDentifier (UUID), a SubSystem IDentification (SSID), and an Internet protocol (IP) address) for connection with the electronic device 1230.

According to certain embodiments, the capability exchange protocol 1253 is a protocol for exchanging information related to a service function that is supported by at least one of the electronic devices 1210 and 1230. For example, through the capability exchange protocol 1253, the electronic devices 1210 and 1230 mutually exchanges information related to service functions currently provided thereby. The exchangeable information includes identification information indicating a particular service among a plurality of services that is supported by the electronic devices 1210 and 1230. For example, through the capability exchange protocol 1253, the electronic device 1210 receives, from the electronic device 1230, identification information of a particular service provided by the electronic device 1230. In certain embodiments, the electronic device 1210 determines whether the electronic device 1210 supports the particular service, based on the received identification information.

According to certain embodiments, the network protocol 1255 is a protocol for controlling flow of data transmitted or received to provide a service between the electronic devices (such as the electronic devices 1210 and 1230) connected to communicate with each other. For example, at least one of the electronic devices 1210 and 1230 performs an error control or a data quality control using the network protocol 1255. The network protocol 1255 determines a transmission format of data transmitted or received between the electronic devices 1210 and 1230. In addition, using the network protocol 1255, at least one of the electronic devices 1210 and 1230 manages (such as connect or terminates) at least a session for data exchange between the electronic devices.

According to certain embodiments, the application protocol 1257 is a protocol for providing a procedure or information for exchanging data related to a service provided to an external electronic device. For example, the electronic device 1210 (such as the electronic device 101) provides a service to the electronic device 1230 (such as the electronic device 104 or the server 106) through the application protocol 1257.

According to certain embodiments, the communication protocol 1200 includes a standard communication protocol, a communication protocol designated by an individual or organization (such as a communication protocol self-designated by a communication device maker or a network provider) or a combination thereof.

The term "module" as used in various embodiments of the present disclosure means, for example, a unit including one of hardware, software, and firmware or any combination of two or more of them. The "module" is interchangeably used with a term, such as unit, logic, logical block, component, or circuit. The "module" is the smallest unit of an integrated component or a part thereof. The "module" is the smallest unit that performs one or more functions or a part thereof. The "module" is mechanically or electronically implemented. For example, the "module" according to various embodiments of the present disclosure includes at least one of an application-specific integrated circuit (ASIC) chip, a field-programmable gate array (FPGA), and a programmable-logic device for performing certain operations, which are now known or will be developed in the future.

At least some of the devices (such as modules or functions thereof) or methods (such as operations) according to various embodiments of the present disclosure are implemented by, for example, by a command stored in a computer-readable storage medium in the form of a programming module. When the command is executed by one or more processors, the one or more processors performs a function corresponding to the command. The computer-readable storage medium is, for example, the memory 260. At least some of the programming modules is implemented (for example, executed) by, for example, the processor. At least a part of the programming module includes, for example, a module, a program, a routine, a set of instructions or a process for performing one or more functions.

The computer readable recording medium includes magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions includes high class language codes, which is executed in a computer by using an interpreter, as well as machine codes made by a compiler. The aforementioned hardware device is configured to operate as one or more software modules in order to perform the operation of various embodiments of the present disclosure, and vice versa.

Any of the modules or programming modules according to various embodiments of the present disclosure include at least one of the above described elements, exclude some of the elements, or further include other additional elements. The operations performed by the modules, programming module, or other elements according to various embodiments of the present disclosure are executed in a sequential, parallel, repetitive, or heuristic manner. Further, some operations are executed according to another order or can be omitted, or other operations can be added.

According to various embodiments, in a storage medium having instructions stored therein, the instructions are configured such that at least one processor performs at least one operation when the instructions are executed by the at least one processor, and the at least one operation includes: determining content to display to the outside of an electronic device based on contextual information associated with the electronic device; configuring at least one region of a display screen functionally connected to the electronic device as a highlighted region; and displaying, through the highlighted region, at least a part of the content in a higher visibility state than the remaining region of the display screen except for the highlighted region.

Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A display control method comprising:
setting, in response to detecting a first user input, one region of a display as a highlighted region;
displaying a part of at least one content to display in a higher visibility state than a remaining region of the display based on the highlighted region;
determining, in response to detecting a second user input, whether to operate in a first mode or in a second mode, whilst the part of the at least one content is being displayed;
if the operating occurs in the first mode, moving a location of the highlighted region based on the second user input; and
if the operating occurs in the second mode, executing at least one of a function and an application corresponding to the at least one content based on the second user input.

2. The display control method of claim 1,
wherein the at least one content is determined based on contextual information associated with an electronic device, and
wherein the contextual information comprises an event, a location, a time, a battery state, and a running application, which are related to the electronic device, information related to an accessory functionally connected to the electronic device, information related to an external device connected to the electronic device, or information acquired from a sensor functionally connected to the electronic device.

3. The display control method of claim 2, wherein determining the at least one content comprises:
determining at least one of a function and an application associated with an event relevant to the electronic device as the part of the content in response to the event.

4. The display control method of claim 3, wherein the event comprises an event generated in at least one case among: a case where ambient environment information measured by a sensor functionally connected to the electronic device corresponds to a first designated condition, a case where state information of the electronic device corresponds to a second designated condition, or a case where the electronic device receives a call or a message from an external device.

5. The display control method of claim 2, wherein determining the at least one content comprises:
determining a current date, a day of a week, a time, or at least one combination thereof as the part of the content when locking is configured to restrict at least some functions of the electronic device.

6. The display control method of claim 2, wherein determining the at least one content comprises:
acquiring recently updated information from a website that provides information updated in real time when the website exists in a visit history associated with the electronic device; and
determining the recently updated information as the part of the at least one content.

7. The display control method of claim 2, wherein setting the one region of the display as the highlighted region comprises:
determining a location of the highlighted region based on at least one of the contextual information, a designated location, or one or more of the first user input and the second user input.

8. The display control method of claim 1, wherein one or more of the first user input or the second user input comprises at least one of: a proximity input, a touch input, a gesture input, or a gaze input, that are associated with an electronic device.

9. The display control method of claim 2, wherein setting the one region of the display as the highlighted region comprises:
determining one or more of a shape and a size of the highlighted region based on at least one of: the contextual information, information configured in relation to the highlighted region, the first user input associated with the electronic device, a display attribute of the content, or a display setting of the highlighted region.

10. The display control method of claim 1, wherein setting the one region of the display as the highlighted region comprises:
determining the remaining region of the display, except for a region where a blocked content designated by a user is displayed, as the highlighted region when the part of the content is determined to correspond to the blocked content.

11. The display control method of claim 2, wherein displaying the part of the at least one content comprises:
adjusting a display setting of the highlighted region based on at least one of: the contextual information, information configured in relation to the highlighted region, a second user input associated with the electronic device, or a display attribute of the content.

12. The display control method of claim 11, wherein adjusting the display setting comprises:
reducing a brightness of the highlighted region when a battery level of the electronic device is lower than a predetermined reference.

13. The display control method of claim 11, wherein adjusting the display setting comprises:
controlling the display to turn off at least some of multiple light emitting devices constituting the highlighted region.

14. The display control method of claim 2, wherein displaying at least the part of the at least one content comprises:
adjusting a display attribute of the content based on at least one of: the contextual information, information configured in relation to the highlighted region, a second user input associated with the electronic device, or a display setting of the highlighted region.

15. The display control method of claim 2, wherein displaying at least the part of the at least one content comprises:
adjusting a color, a brightness, or a size of the content, magnifying, reducing, or rotating the content, or reversing a left and a right of the content based on the contextual information.

16. The display control method of claim 1, wherein moving the location of the highlighted region comprises:
recognizing at least one of: a proximity movement input, a swipe input, or a gaze movement input, which are associated with the highlighted region, while at least the part of the content is being displayed through the highlighted region; and
moving the location of the highlighted region based on the recognized input.

17. The display control method of claim 1, wherein displaying the part of the at least one content comprises:
recognizing the second user input associated with an electronic device while at least the part of the content is being displayed through the highlighted region; and
adjusting at least one of a size and a shape of the highlighted region based on the second user input.

18. The display control method of claim 1, wherein displaying the part of the at least one content further comprises at least one of:
turning off at least some pixels in the remaining region; and
displaying the remaining region to output a same color through the at least some pixels.

19. The display control method of claim 18, wherein displaying the remaining region comprises:
displaying the remaining region in a manner that the at least some pixels and remaining pixels except for the at least some pixels in the remaining region form a grid pattern.

20. The display control method of claim 1, wherein displaying the part of the at least one content comprises:

recognizing an event generated in an electronic device while at least the part of the content is being displayed through the highlighted region; and executing at least one of a function and an application, which are associated with the event, using at least a part of the highlighted region in response to the event.

21. The display control method of claim 20, wherein the event comprises an event generated in at least one case among: a case where ambient environment information measured by a sensor functionally connected to the electronic device corresponds to a first designated condition, a case where state information of the electronic device corresponds to a second designated condition, or a case where the electronic device receives a call or a message from an external device.

22. An electronic device comprising:
a display configured to display at least one content; and
at least one processor configured to:
set, in response to detecting a first user input, one region of the display as a highlighted region;
display a part of the at least one content to display in a higher visibility state than a remaining region of the display based on the highlighted region;
determine, in response to detecting a second user input, whether to operate in a first mode or in a second mode, whilst the part of the at least one content is being displayed;
if the operating occurs in the first mode, move a location of the highlighted region based on the second user input; and
if the operating occurs in the second mode, execute at least one of a function and an application corresponding to the at least one content based on the second user input.

23. The electronic device of claim 22, wherein the display comprises at least one of: an organic light-emitting diode (OLED), a liquid-crystal display (LCD), or electronic paper (e-paper).

24. The electronic device of claim 22, wherein the at least one processor is further configured to:
detect an event related to the electronic device; and
determine at least one of a function and an application associated with the event as at least the part of the content.

25. The electronic device of claim 24, further comprising:
an environmental information sensor functionally connected to the at least one processor,
wherein the at least one processor is configured to:
measure ambient environment information of the electronic device through the environmental information sensor; and
generate an event related to the ambient environment information when the ambient environment information corresponds to a designated condition.

26. The electronic device of claim 25, wherein the at least one processor is further configured to detect the event related to the ambient environment information when a state of the electronic device corresponds to a designated condition.

27. The electronic device of claim 24, wherein the at least one processor is further configured to detect an event related to a call or a message when the electronic device receives the call or the message from an external device.

28. The electronic device of claim 22, wherein the at least one processor is further configured to perform at least one of: turning off at least some pixels of light emitting devices constituting at least one of the region and the remaining region of the display or displaying the remaining region to output a same color through the at least some pixels.

29. The electronic device of claim 28, wherein the at least one processor is configured to display the remaining region such that the at least some pixels and other pixels except for the at least some pixels among pixels in the remaining region form a grid pattern.

30. A non-transitory computer readable storage medium having instructions stored therein, comprising a plurality of instructions configured to, when executed by at least one processor of an electronic device, cause the at least one processor to:
set, in response to detecting a first user input, at least one region of a display as a highlighted region;
display a part of at least one content to display in a higher visibility state than a remaining region of the display based on the highlighted region;
determine, in response to detecting a second user input, whether to operate in a first mode or in a second mode, whilst the part of the at least one content is being displayed;
if the operating occurs in the first mode, move a location of the highlighted region based on the second user input; and
if the operating occurs in the second mode, execute at least one of a function and an application corresponding to the at least one content based on the second user input.

* * * * *